(12) United States Patent
Kim et al.

(10) Patent No.: US 10,741,904 B2
(45) Date of Patent: Aug. 11, 2020

(54) ELECTRONIC DEVICE INCLUDING ANTENNA UNIT

(71) Applicant: Samsung Electronics Co., Ltd., Suwon-si, Gyeonggi-do (KR)

(72) Inventors: Seungkyu Kim, Daegu (KR); Hyunjong Oh, Daegu (KR); Chulhyung Yang, Gumi-si (KR); Jiwoo Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 15/433,343

(22) Filed: Feb. 15, 2017

(65) Prior Publication Data

US 2017/0244149 A1    Aug. 24, 2017

(30) Foreign Application Priority Data

Feb. 18, 2016    (KR) ........................ 10-2016-0019089

(51) Int. Cl.
| | |
|---|---|
| *H01Q 1/22* | (2006.01) |
| *H01Q 5/307* | (2015.01) |
| *H01Q 1/24* | (2006.01) |
| *H01Q 5/371* | (2015.01) |
| *H01Q 5/35* | (2015.01) |

(Continued)

(52) U.S. Cl.
CPC ........... *H01Q 1/2291* (2013.01); *H01Q 1/243* (2013.01); *H01Q 1/38* (2013.01); *H01Q 1/48* (2013.01); *H01Q 5/307* (2015.01); *H01Q 5/35* (2015.01); *H01Q 5/371* (2015.01); *H04W 84/12* (2013.01)

(58) Field of Classification Search
CPC ........ H01Q 1/2291; H01Q 1/38; H01Q 5/371; H01Q 1/243; H01Q 5/35; H01Q 1/48; H04W 84/12
See application file for complete search history.

(56) References Cited

U.S. PATENT DOCUMENTS

| | | |
|---|---|---|
| 8,659,482 B2 | 2/2014 | Kim et al. |
| 2011/0193754 A1 | 8/2011 | Schlub et al. |

(Continued)

FOREIGN PATENT DOCUMENTS

| | | |
|---|---|---|
| KR | 10-2010-0108062 A | 10/2010 |
| KR | 10-1550061 B1 | 9/2015 |

*Primary Examiner* — Graham P Smith
*Assistant Examiner* — Jae K Kim
(74) *Attorney, Agent, or Firm* — Jefferson IP Law, LLP

(57) ABSTRACT

An electronic device is provided, including a housing, a side member, a display, a printed circuit board (PCB), and a communication device. The housing includes a first plate facing a first direction and a second plate facing a second direction opposite to the first direction, forming a space between the first and second plates. The side member surrounds at least part of the space. The communication device is disposed in the housing and connected with the PCB. The side member includes a first antenna unit disposed on one side of the electronic device, electrically connected with a radio frequency (RF) module, and having a first metal frame. The housing further includes a board-type antenna which includes a second antenna unit electrically connected with a WiFi module, an antenna connector configured to electrically connect the first and second antenna units, and a third antenna unit electrically connected with the antenna connector.

9 Claims, 23 Drawing Sheets

(51) Int. Cl.
*H01Q 1/38* (2006.01)
*H01Q 1/48* (2006.01)
*H04W 84/12* (2009.01)

(56) References Cited

U.S. PATENT DOCUMENTS

2012/0262345 A1* 10/2012 Kim .................. H01Q 1/243
 343/702
2013/0135157 A1* 5/2013 Tsou .................. H01Q 1/2266
 343/702
2014/0292590 A1* 10/2014 Yoo .................. H01Q 1/243
 343/702

\* cited by examiner

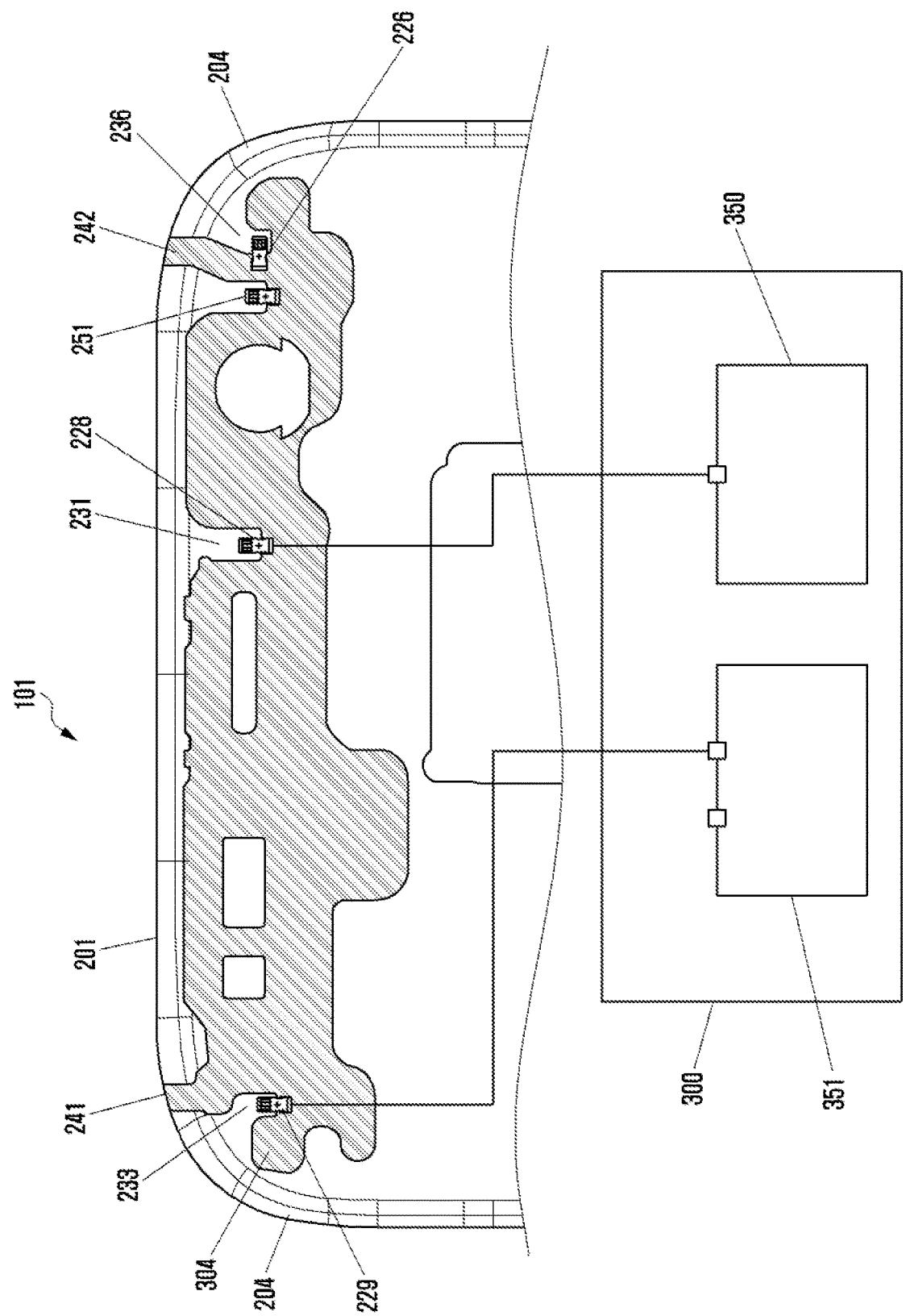

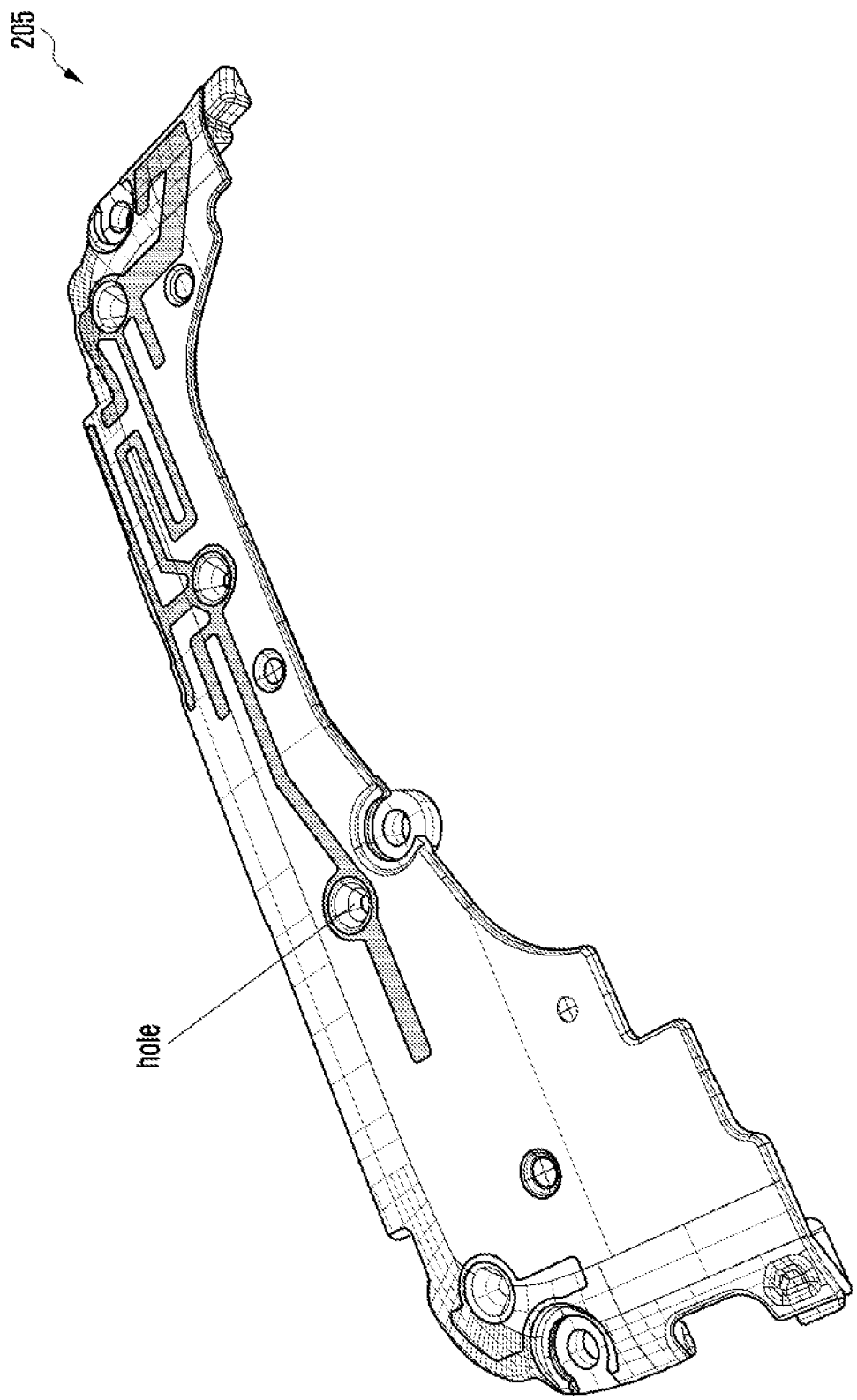

ELECTRONIC DEVICE INCLUDING ANTENNA UNIT

CROSS-REFERENCE TO RELATED APPLICATION(S)

This application claims the benefit under 35 U.S.C. § 119(a) of a Korean patent application filed on Feb. 18, 2016 in the Korean Intellectual Property Office and assigned Serial number 10-2016-0019089, the entire disclosure of which is hereby incorporated by reference.

TECHNICAL FIELD

The present disclosure relates to an electronic device having antenna units formed of different types of antennas.

BACKGROUND

With a remarkable growth of digital technologies, a great variety of electronic devices, such as a smart phone, a mobile communication terminal, a tablet personal computer (PC), a wearable device, and the like, which have the ability to allow communication and process information are increasingly popularized in these days.

Such electronic devices become thinner gradually and have a larger-sized display screen, thus requiring a strong housing or body. In order to guarantee the rigidity of the electronic device and also offer an elegant appearance, the housing of the electronic device is often made of metal or the like.

Meanwhile, the electronic device tends to support various radio frequency (RF) bands. For supporting various RF bands in the electronic device having a limited size, new antenna technique such as a metal frame segmented structure in which a metal housing itself is utilized as an antenna is now used.

However, due to a limited size of the electronic device, an antenna using only a segmented metal frame often has difficulty in guaranteeing the bandwidth of a communication band. Additionally, trying to guarantee the bandwidth by shifting a resonance frequency between antennas through a switch or the like causes a serious degradation of antenna radiation efficiency due to unintended coupling of antennas.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device to improve antenna efficiency by connecting different types of antennas.

In accordance with an aspect of the present disclosure, an electronic device is provided. The electronic device includes a housing including a first plate facing a first direction and a second plate facing a second direction opposite to the first direction, and forming a space between the first and second plates, a side member surrounding at least part of the space, a display disposed in the housing and exposed through the first plate, a printed circuit board (PCB) disposed in the housing and between the display and the second plate, a board-type antenna, and a communication device disposed in the housing and connected with the PCB. In the electronic device, the side member may include a first antenna unit disposed on one side of the electronic device, electrically connected with a radio frequency (RF) device, the first antenna unit including a first metal frame. Also, the board-type antenna may include a second antenna unit electrically connected with a WiFi device, an antenna connector configured to electrically connect the first and second antenna units, and a third antenna unit electrically connected with the antenna connector.

In accordance with another aspect of the present disclosure, an electronic device is provided. The electronic device includes a first antenna unit electrically connected with an RF device and including a first metal frame, a second antenna unit electrically connected with a WiFi device and disposed on a board-type antenna, an antenna connector configured to electrically connect the first and second antenna units and disposed on the board-type antenna, and a third antenna unit electrically connected with the antenna connector and disposed on the board-type antenna.

According to various embodiments of the present disclosure, the connection of different types of antennas may guarantee a sufficient bandwidth of communication band and also improve a radiation efficiency of antenna.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3C is an exploded plan view of an electronic device, at a front side, according to various embodiments of the present disclosure.

FIGS. 3D, 3E, and 3F are perspective views of a board-type antenna according to various embodiments of the present disclosure.

Figure 1A:
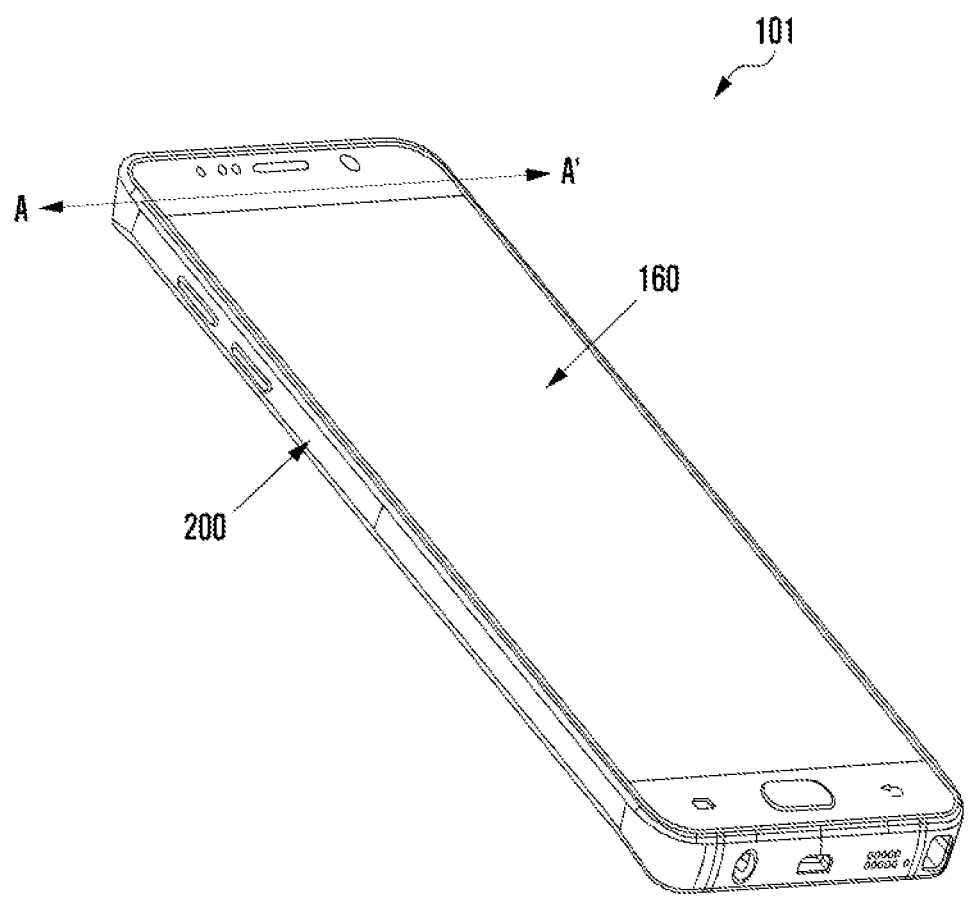
FIG. 1A is a perspective view of an electronic device according to various embodiments of the present disclosure.

Other aspects, advantages, and salient features of the disclosure will become apparent to those skilled in the art from the following detailed description, which, taken in conjunction with the annexed drawings, discloses various embodiments of the present disclosure.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the" include the plural referents unless the content clearly indicates otherwise. Thus, for example, reference to "a component surface" includes reference to one or more of such surfaces.

The term "or" means "and/or", which includes any and all combinations of one or more of the associated listed items. The terms "comprises" and/or "comprising", or "includes" and/or "including" specify the presence of stated items, but do not preclude the presence or addition of one or more other items. The expressions "first", "second", etc. are used merely for the purpose of distinguishing one element from the others without regard to the order or importance of such elements. When a certain element (e.g., first element) is referred to as being "connected" or "coupled" (operatively or communicatively) to another element (e.g., second element), it may mean that the first element is connected or coupled directly to the second element or indirectly through any other element (e.g., third element).

The expression "configured to" may be interchangeably used with any other expressions "suitable for", "having the ability to", "designed to", "adapted to", "made to", and "capable of". The expression "device configured to" may mean that the device, together with other devices or components, "is able to". For example, the phrase "processor configured to perform A, B and C" may mean a dedicated processor (e.g., embedded processor) for performing corresponding operations or a generic-purpose processor (e.g., central processing unit (CPU) or application processor (AP)) capable of performing corresponding operations by executing one or more software programs stored in a memory.

In this disclosure, an electronic device may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a portable medical device, a digital camera, or a wearable device. This wearable device may include at least one of an accessory-type device (e.g., a watch, a ring, a bracelet, an anklet, a necklace, glasses, a contact lens, or a head-mounted device (HMD), a fabric- or cloth-type device (e.g., electronic cloth), a body-attached type device (e.g., a skin pad or tattoo), or a body-implemented type circuit. In some embodiments, an electronic device may include at least one of a television (TV), a digital video disc (DVD) player, audio equipment, a refrigerator, an air conditioner, a vacuum cleaner, an oven, a microwave, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic picture frame.

In some embodiments, an electronic device may include at least one of a medical device (e.g., portable medical measuring equipment (e.g., a blood sugar meter, a heart rate meter, a blood pressure meter, a clinical thermometer, etc.), a magnetic resonance angiography (MRA), a magnetic resonance imaging (MRI), a computed tomography (CT), an ultrasonography, etc.), a navigation device, a global navigation satellite system (GNSS), an event data recorder (EDR), a flight data recorder (FDR), a car infotainment device, electronic equipment for ship (e.g., a marine navigation system, a gyrocompass, etc.), avionics, security equipment, a car head unit, an industrial or home robot, a drone, an automated teller machine (ATM), a point of sales (POS), or a device for internet of things (IoT) (e.g., a bulb, a sensor, a sprinkler, a fire alarm, a thermostat, a streetlight, a toaster, athletic equipment, a hot-water tank, a heater, a boiler, etc.). According to some embodiments, an electronic device may include at least one of furniture, a part of a building/construction or car, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are not to be considered as a limitation of this disclosure.

FIG. 1A is a perspective view of an electronic device 101 according to various embodiments of the present disclosure.

Referring to FIG. 1A, the electronic device 101 may include a display 160 and a metal frame 200 for forming outward appearances thereof. The electronic device 101 may expose at least part of the display 160 to the front face thereof. The metal frame 200, together with the display 160 disposed on the front side of the electronic device 101 and a rear cover disposed on the rear side of the electronic device 101, may constitute a housing of the electronic device 101 and also define an inner space of the electronic device 101. In this inner space of the electronic device 101, various electronic components such as a printed circuit board (PCB) or a battery may be mounted. This PCB may be flexible.

According to various embodiments, the display 160 may include a panel, a hologram, or a projector. The panel may be implemented so as to be, for example, flexible, transparent, or wearable. The panel, together with a touch panel, may form one module. The hologram may display a three-dimensional image in the air by using interference of light. The projector may display an image by projecting light on a screen. This screen may be disposed at the inside or outside of the electronic device 101. According to various embodiments, the display 160 may further include a control circuit for controlling the panel, the hologram, or the projector.

According to various embodiments, the display 160 may include a window and a display module (e.g., a display panel). The window of the display 160 may be formed of tempered glass and exposed to the front side of the electronic device 101. The window of the display 160 may form the housing of the electronic device 101, together with the metal frame 200 and the rear cover. The housing of the electronic device 101 may include the window of the display 160 as the first plate, and the rear cover as the second plate. The rear cover may be formed of various materials, for example, tempered glass, metal, synthetic resin (e.g., plastic), wood, fabric, or leather.

According to various embodiments, the metal frame 200 may be segmented. The segmented metal frame may be isolated by a nonconductive material.

Figure 1B:
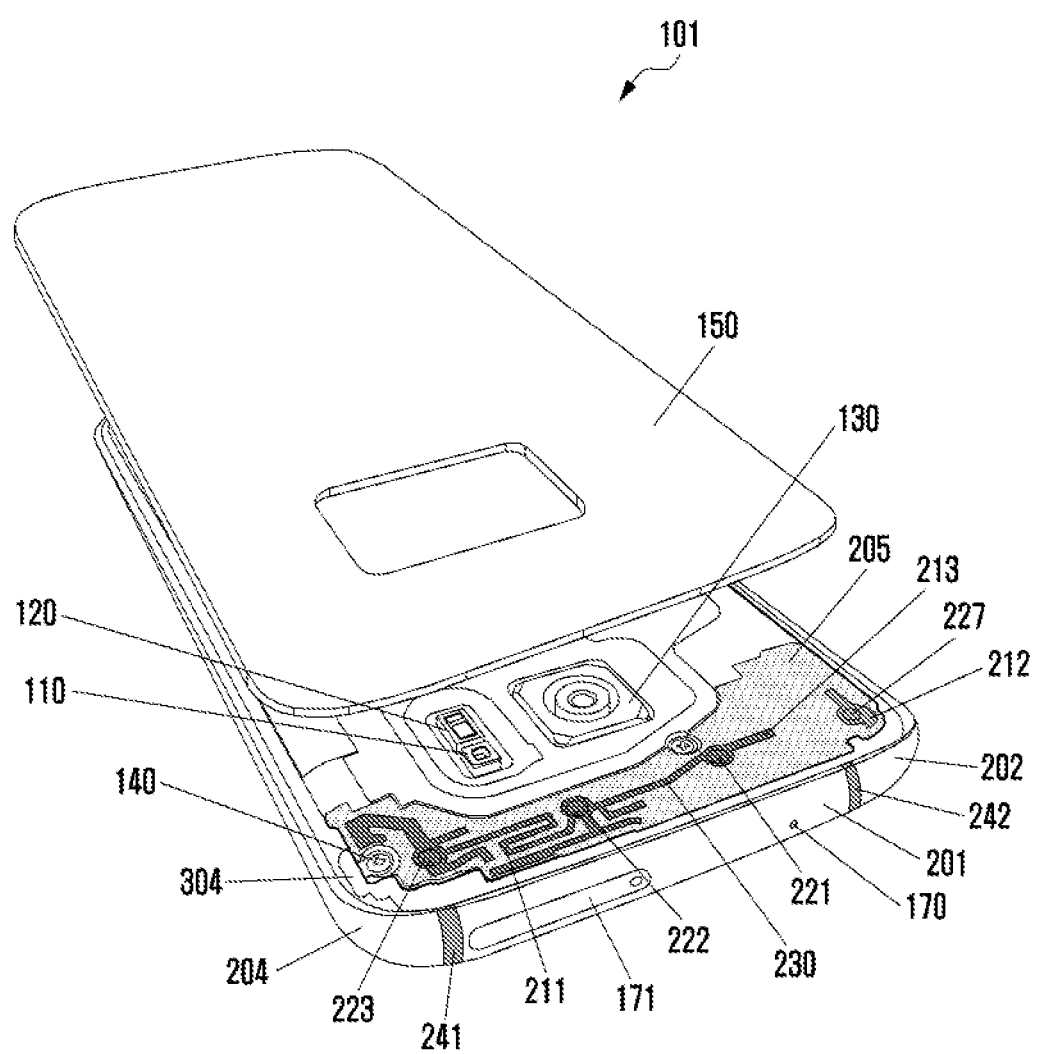
FIG. 1B is an exploded perspective view of an electronic device according to various embodiments of the present disclosure.

FIG. 1B is an exploded perspective view of the electronic device 101 according to various embodiments of the present disclosure.

Figure 9:
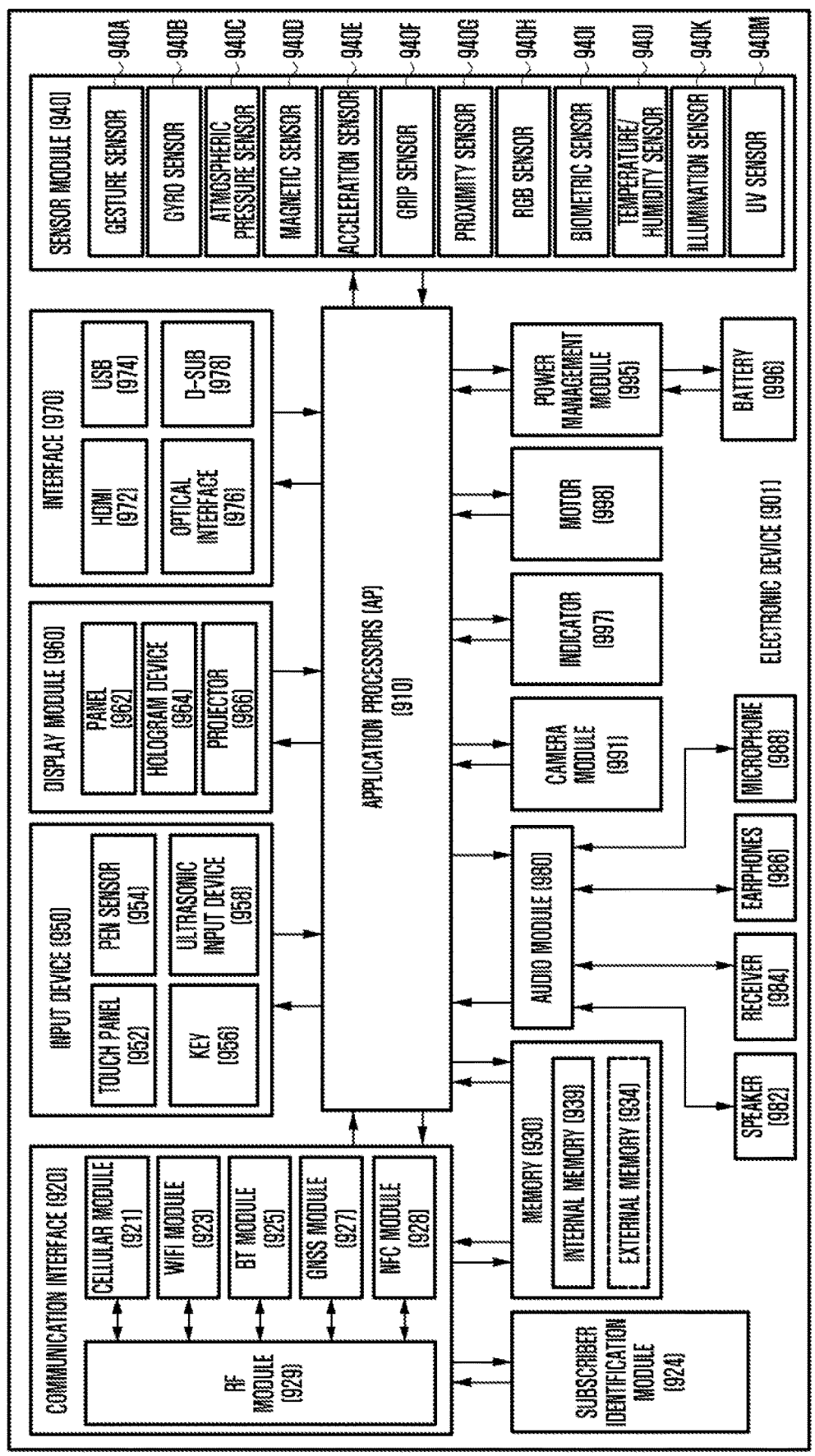
FIG. 9 is a block diagram illustrating an electronic device according to various embodiments of the present disclosure.

Referring to FIG. 1B, the rear cover 150 may include, at a part thereof, an opening so as to expose at least one of a flash 110, a heart rate monitoring (HRM) sensor 120, and a camera module 130 (e.g., a camera module 991 shown in FIG. 9). The rear cover 150 may be formed of various materials, for example, tempered glass, metal, synthetic resin (e.g., plastic), wood, fabric, or leather.

According to various embodiments, the electronic device 101 may dispose at least one of the flash 110, the HRM sensor 120, and the camera module 130 (e.g., the camera module 991 shown in FIG. 9) under the rear cover 150. A board-type antenna 205 may be fixed to the electronic device 101 by at least one fastening member 140. If a first segmented metal frame 201 is disposed at the upper end of the electronic device 101 as shown in FIG. 1B, the board-type antenna 205 may be disposed near the upper end of the electronic device 101. The fastening member 140 for fixing the board-type antenna 205 may be, for example, a screw.

According to various embodiments, the electronic device 101 may include the segmented metal frame 201 and additional segmented metal frames 202 and 204. The segmented metal frames 201, 202 and 204 may be electrically isolated from the board-type antenna 205 by an insulating member 304.

According to various embodiments, the electronic device 101 may include slits 241 and 242 for electrically isolating the segmented metal frames 201, 202 and 204 from each other. The first slit 241 may be disposed between the first and fourth segmented metal frames 201 and 204 and filled with the insulating member 304. The second slit 242 may be disposed between the first and second segmented metal frames 201 and 202 and filled with the insulating member 304. The first segmented metal frame 201 may have, at a part thereof, a microphone hole 170 and/or a subscriber identification module (SIM)/secure digital (SD) card slot 171.

According to various embodiments, the board-type antenna 205 may include one or more antenna patterns 211, 212, 213 and 230. The first antenna pattern 211 may be an embedded antenna of the electronic device 101. For example, the first antenna pattern 211 may be a WiFi printed antenna pattern and operate as a WiFi antenna. The second antenna pattern 212 may be a GNSS printed antenna pattern and operate as a GNSS antenna. For example, the second antenna pattern 212 may operate as an internal antenna of the electronic device 101. The second antenna pattern 212 may be electrically connected with a seventh feeding member 227.

According to various embodiments, the third antenna pattern 213 may be a stub printed antenna pattern. The third antenna pattern 213 may be connected with the first segmented metal frame 201 through a first feeding member 221. The third antenna pattern 213 may be connected with the second antenna pattern 212 through an antenna connector 230, the first feeding member 221 and a sixth feeding member 222. The third antenna pattern 213 may perform a function to compensate an antenna length of the first segmented metal frame 201. The third antenna pattern 213, together with the antenna connector 230, may improve the performance of a WiFi antenna implemented by the first antenna pattern 211.

According to various embodiments, the board-type antenna 205 may include a printed connection pattern. The printed connection pattern may be the antenna connector 230. Together with the third antenna pattern 213, the antenna connector 230 may improve the performance of a WiFi antenna implemented by the first antenna pattern 211. The first antenna pattern 211 may be electrically connected with a second and a sixth feeding members 223 and 222.

Figure 2A:
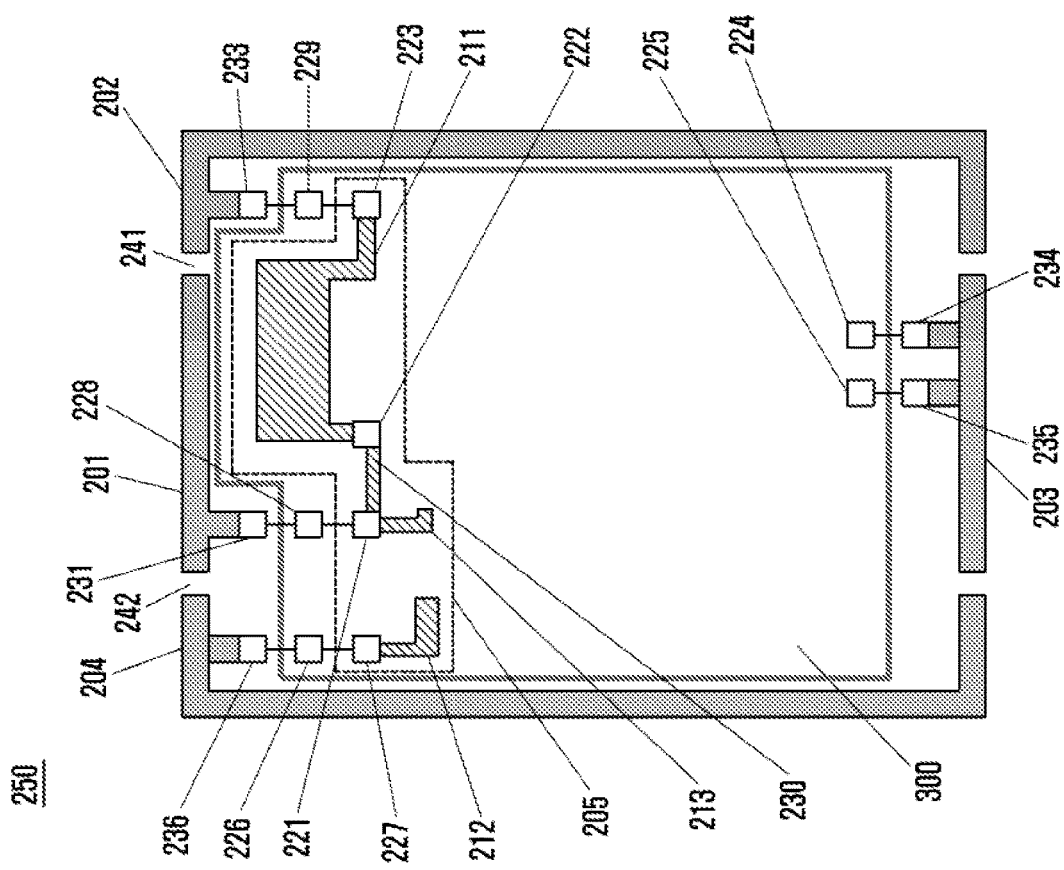
FIGS. 2A and 2B are schematic diagrams illustrating an antenna unit according to various embodiments of the present disclosure.

FIG. 2A is a schematic diagram illustrating an antenna unit 250 according to various embodiments of the present disclosure.

Referring to FIG. 2A, the metal frame 200 may include segmented metal frames 201, 202, 203 and 204. The segmented metal frames 201, 202, 203 and 204 may be isolated from each other by a nonconductive material and also, together with the nonconductive material, form the housing of the electronic device 101 partly. Slits 241 and 242 may be disposed respectively between the segmented metal frames 201, 202, 203 and 204.

According to various embodiments, the first segmented metal frame 201 may be electrically connected with the board-type antenna 205 through the first feeding member 221, an eighth feeding member 228, and a first contact 231. The first segmented metal frame 201 may be, for example, the metal frame 200 disposed at the upper end of the electronic device 101. The first feeding member 221 may be designed for one or more frequencies of long term evolution (LTE) 1/5/8 bands, wideband code division multiple access (WCDMA) 1/2/5 bands, a G900 band, and a personal communication service (PCS) band. The first feeding member 221 may be disposed on one side (e.g., in the direction of the rear cover 150) of a PCB 300, and the eighth feeding member 228 may be disposed on the other side (e.g., in the direction of the display 160) of the PCB 300. The first and eighth feeding members 221 and 228 may be electrically connected with each other. The eighth feeding member 228 may be connected with the first segmented metal frame 201. The board-type antenna 205 may be disposed on the PCB 300. The first feeding member 221 may connect the third antenna pattern 213 and the antenna connector 230. The board-type antenna 205 and the first segmented metal frame 201 may be connected with each other through the eighth feeding member 228. The first contact 231 may be disposed on the insulating member 304. The first contact 231 may be electrically connected with the first segmented metal frame

201. The first contact 231 may be electrically connected with the eighth feeding member 228.

According to various embodiments, the second segmented metal frame 202 may be electrically connected with the board-type antenna 205 through the second feeding member 223, a ninth feeding member 229, and a second contact 233. The second segmented metal frame 202 may be, for example, the metal frame 200 disposed at the right side of the electronic device 101. The second feeding member 223 may be designed for one or more frequencies of the first WiFi band and the Bluetooth (BT) band. For example, the first WiFi band may be a 2.4 GHz band and/or a 5 GHz band. Specifically, the 2.4 GHz band may be a 2.40~2.495 GHz band, and the 5 GHz band may be a 5.15~5.825 GHz band. The second segmented metal frame 202 may perform a function of ground.

The second feeding member 223 may be disposed on one side (e.g., in the direction of the rear cover 150) of the PCB 300, and the ninth feeding member 229 may be disposed on the other side (e.g., in the direction of the display 160) of the PCB 300. The second and ninth feeding members 223 and 229 may be electrically connected with each other. The ninth feeding member 229 may be connected with the second segmented metal frame 202. The second feeding member 223 may be connected with an embedded antenna (e.g., a WiFi antenna) implemented by the first antenna pattern 211. The board-type antenna 205 and the second segmented metal frame 202 may be connected with each other through the ninth feeding member 229. An embedded antenna (e.g., a WiFi antenna) implemented by the first antenna pattern 211 may be electrically connected with the second and sixth feeding members 223 and 222. The second contact 233 may be disposed on the insulating member 304. The second contact 233 may be electrically connected with the second segmented metal frame 202. The second contact 233 may be electrically connected with the ninth feeding member 229.

According to various embodiments, the third segmented metal frame 203 may be electrically connected with at least one of a third and a fourth feeding members 224 and 225. The third segmented metal frame 203 may be electrically connected with the third feeding member 224 through a third contact 234. The third segmented metal frame 203 may be electrically connected with the fourth feeding member 225 through a fourth contact 235. For example, the third segmented metal frame 203 may be the metal frame 200 disposed at the lower end of the electronic device 101. The third feeding member 224 may be designed for one or more frequencies of LTE 5/8 bands, a WCDMA 5 band, and a G900 band. The fourth feeding member 225 may be designed for one or more frequencies of LTE 1/3/7 bands, WCDMA 1/2 bands, a digital cellular system (DCS) band, and a PCS band.

According to various embodiments, the fourth segmented metal frame 204 may be electrically connected with the board-type antenna 205 through a fifth feeding member 226, the seventh feeding member 227, and a fifth contact 236. The fourth segmented metal frame 204 may be the metal frame disposed at the left side of the electronic device 101. A communication module (e.g., the communication interface 920 as shown in FIG. 9, especially, the WiFi module 923, the GNSS module 927, or the RF module 929 in FIG. 9) may transmit or receive a signal of one or more frequencies of LTE 3/7 bands, a DCS band, and a GPS band through the fifth and seventh feeding members 226 and 227.

The seventh feeding member 227 may be disposed on one side (e.g., in the direction of the rear cover 150) of the PCB 300, and the fifth feeding member 226 may be disposed on the other side (e.g., in the direction of the display 160) of the PCB 300. The fifth and seventh feeding members 226 and 227 may be electrically connected with each other. The fifth feeding member 226 may be connected with the fourth segmented metal frame 204. The seventh feeding member 227 may be connected with an embedded antenna (e.g., a GNSS antenna) implemented by the second antenna pattern 212. The board-type antenna 205 and the second segmented metal frame 202 may be connected with each other through the fifth feeding member 226. The fifth contact 236 may be disposed on the insulating member 304. The fifth contact 236 may be electrically connected with the fourth segmented metal frame 204. The fifth contact 236 may be electrically connected with the fifth feeding member 226.

According to various embodiments, the first, second, third and fourth segmented metal frames 201, 202, 203 and 204 may be used as antennas. Each of the first, second, third and fourth segmented metal frames 201, 202, 203 and 204 may transmit or receive a signal to or from the feeding member electrically connected thereto. Each of the first, second, third and fourth segmented metal frames 201, 202, 203 and 204 may have a suitable length and/or shape determined depending on a transmitting or receiving frequency.

According to various embodiments, the electronic device 101 may include the board-type antenna 205. For example, the board-type antenna 205 may be an antenna having an antenna pattern formed on a board. For example, the pattern of the board-type antenna 205 may be formed on the board in various manners such as a laser direct structuring (LDS) manner, a direct printing antenna (DPA) manner, or a flexible PCB (FPCB) manner. Although used as antennas, the first, second, third and fourth segmented metal frames 201, 202, 203 and 204 may be disposed at the outward appearance of the electronic device 101, rather than on the PCB 300, and electrically connected with the PCB 300 through, for example, the contact or feeding line.

According to various embodiments, the board-type antenna 205 may include one or more antenna patterns 211, 212, 213 and 230.

According to various embodiments, the first antenna pattern 211 may be electrically connected with the second and sixth feeding members 223 and 222. The sixth feeding member 222 may transmit or receive a signal having a frequency of the second WiFi band. The second WiFi band may be a 2.4 GHz band and/or a 5 GHz band. Specifically, the 2.4 GHz band may be a 2.401~2.495 GHz band, and the 5 GHz band may be a 5.15~5.825 GHz band. According to various embodiments, the antenna connector 230 may electrically connect the first and sixth feeding members 221 and 222. When the first and sixth feeding members 221 and 222 are electrically connected with other, the first segmented metal frame 201 and the first antenna pattern 211 may be also electrically connected with each other. Additionally, when the first segmented metal frame 201 and the first antenna pattern 211 are electrically connected, a resonance path for transmission/reception of frequency may be formed on the first segmented metal frame 201, the first antenna pattern 211 and the third antenna pattern 213 which are electrically connected with each other. Even in case the communication module (e.g., the communication interface 920 as shown in FIG. 9, especially, the RF module 929 or the WiFi module 923 in FIG. 9) emits frequencies simultaneously or forms resonance through the first, second and sixth feeding members 221, 223 and 222, no coupling occurs since the respective antennas are operating at different bands.

Figure 2B:
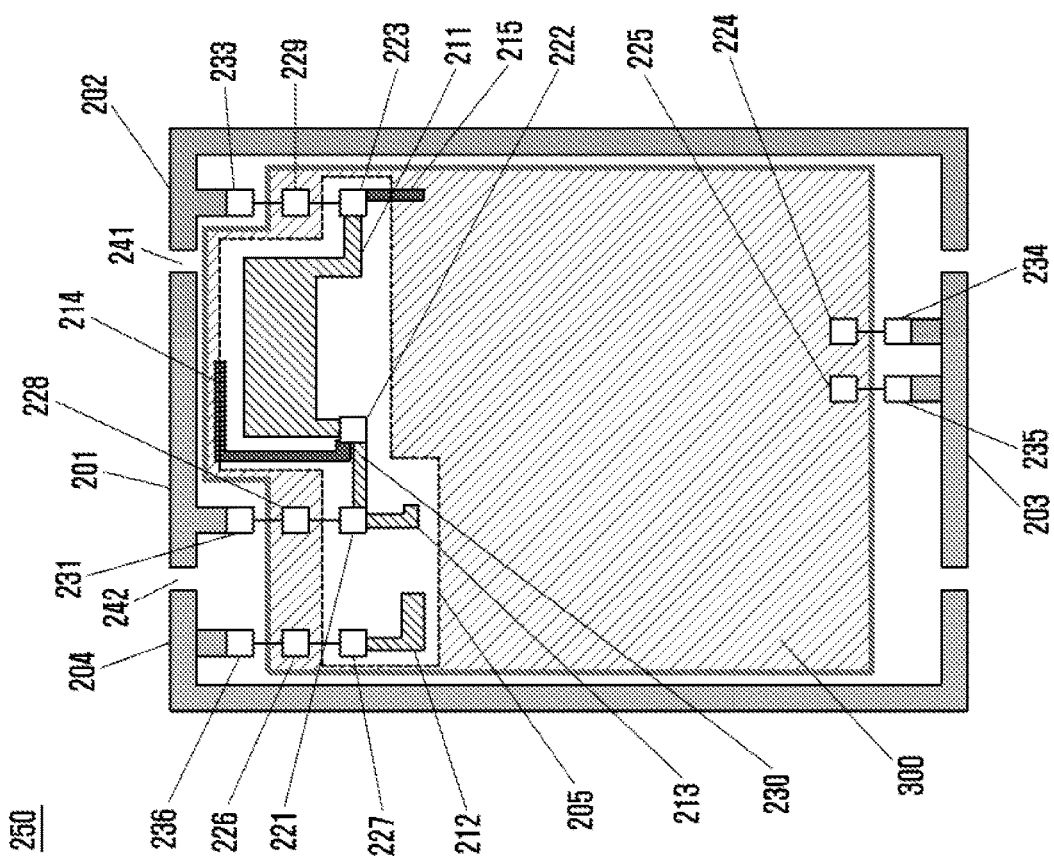

FIG. 2B is a schematic diagram illustrating the antenna unit 250 according to various embodiments of the present disclosure.

In comparison with FIG. 2A, FIG. 2B shows that a PCB embedded antenna (PEA) is added to the board-type antenna 205. The first PEA 214 may be electrically connected with the first antenna pattern 211 and the antenna connector 230 through the sixth feeding member 222. The second PEA 215 may be electrically connected with the first antenna pattern 211 through the second feeding member 223. When the first and second PEAs 214 and 215 are added, supportable bands of a WiFi antenna pattern implemented by the first antenna pattern 211 may be added.

Figure 3A:
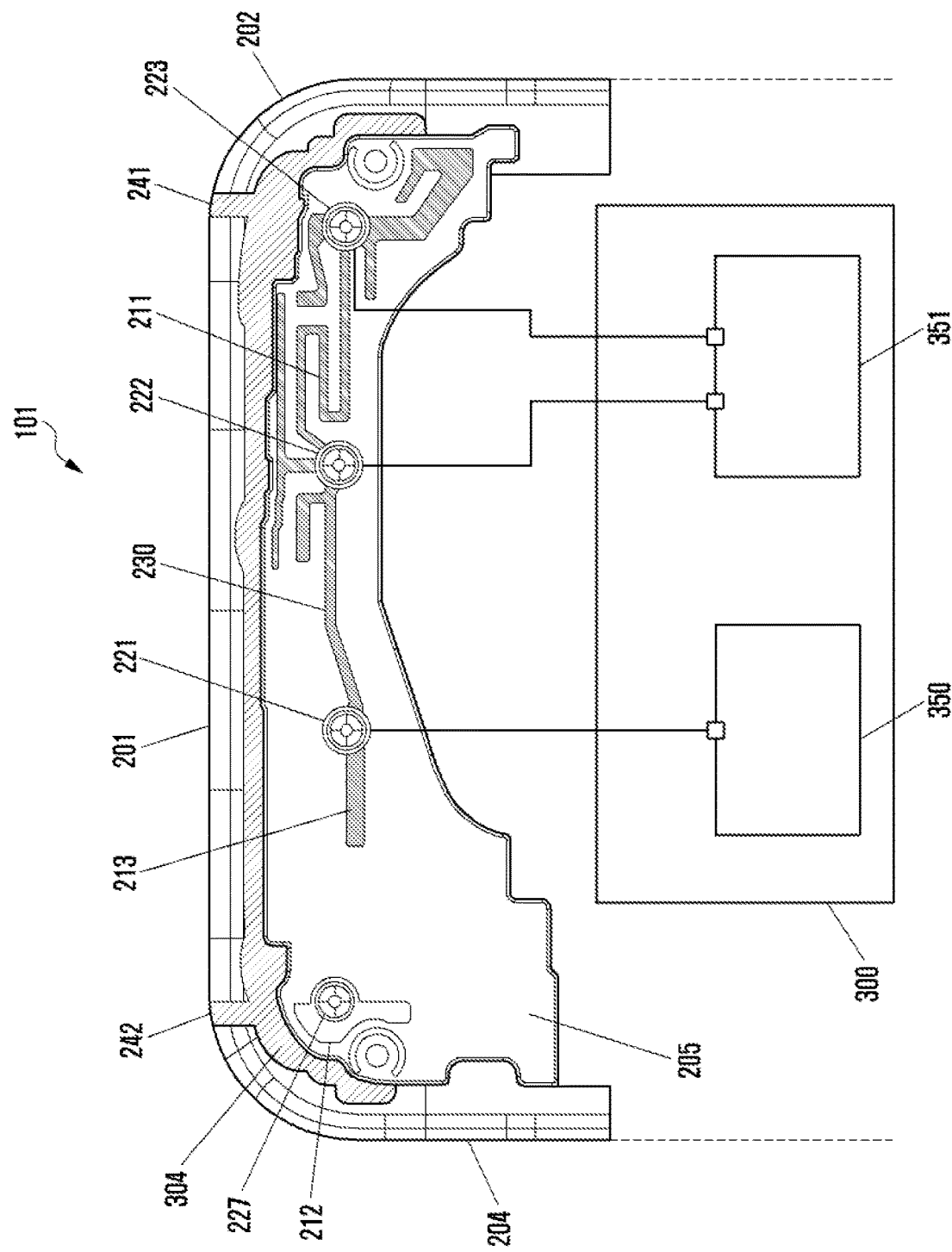
FIG. 3A is an exploded plan view of an electronic device, at a rear side, according to various embodiments of the present disclosure.

FIG. 3A is an exploded plan view of the electronic device 101, at a rear side according to various embodiments of the present disclosure.

Referring to FIG. 3A, the first segmented metal frame 201 may be electrically connected with the board-type antenna 205 through the first feeding member 221. For example, the first segmented metal frame 201 may be the metal frame 200 disposed at the upper end of the electronic device 101. An RF module 350 may transmit or receive a signal of one or more frequency bands of LTE 1/5/8 bands, WCDMA 1/2/5 bands, a G900 band, and a PCS band through the first feeding member 221.

The first feeding member 221 may be disposed on one side (e.g., in the direction of the rear cover 150) of the board-type antenna 205. The board-type antenna 205 may be disposed on the PCB 300. The first feeding member 221 may connect the third antenna pattern 213 and the antenna connector 230. The third antenna pattern 213 may be a stub printed antenna pattern. The third antenna pattern 213, together with the antenna connector 230, may improve the performance of a WiFi antenna implemented by the first antenna pattern 211. The third antenna pattern 213 may perform a function to compensate an antenna length of the first segmented metal frame 201.

According to various embodiments, the board-type antenna 205 may be electrically isolated from the segmented metal frames 201, 202 and 203 through the insulating member 304 or a nonconductive material.

According to various embodiments, the second segmented metal frame 202 may be electrically connected with the board-type antenna 205 through the second feeding member 223. The second metal frame 202 may be, for example, a metal frame disposed at the right side of the electronic device 101. The second feeding member 223 may transmit or receive frequencies of the first WiFi band and the BT band. For example, the first WiFi band may be a 2.4 GHz band and/or a 5 GHz band. Specifically, the 2.4 GHz band may be a 2.401~2.495 GHz band, and the 5 GHz band may be a 5.15~5.825 GHz band. The first and second segmented metal frames 201 and 202 may be divided by the first slit 241 in which the insulating member 304 is disposed. The second feeding member 223 may be disposed on one side (e.g., in the direction of the rear cover 150) of the board-type antenna 205. The second feeding member 223 may be connected with an embedded antenna (e.g., a WiFi antenna) implemented by the first antenna pattern 211.

According to various embodiments, the fourth segmented metal frame 204 may be electrically connected with the board-type antenna 205 through the fifth and seventh feeding members 226 (not shown) and 227. The fourth segmented metal frame 204 may be a metal frame disposed at the left side of the electronic device 101. A communication module such as the RF module 350 or the WiFi module 351 (e.g., the communication interface 920 as shown in FIG. 9, especially, the WiFi module 923, the GNSS module 927, or the RF module 929 in FIG. 9) may transmit or receive a signal of one or more frequency bands of LTE 3/7 bands, a DCS band, and a GPS band through the fifth and seventh feeding members 226 (not shown) and 227.

According to various embodiments, the board-type antenna (e.g., a WiFi antenna) implemented by the first antenna pattern 211 may be electrically connected with the second and sixth feeding members 223 and 222. The WiFi module 351 may transmit or receive a signal of the second WiFi band through the sixth feeding member 222. The second WiFi band may be a 2.4 GHz band and/or a 5 GHz band. Specifically, the 2.4 GHz band may be a 2.401~2.495 GHz band, and the 5 GHz band may be a 5.15~5.825 GHz band.

According to various embodiments, the antenna connector 230 may electrically connect the first and sixth feeding members 221 and 222. When the first and sixth feeding members 221 and 222 are electrically connected with other, the first segmented metal frame 201, the third antenna pattern 213, and an embedded antenna (e.g., a WiFi antenna) implemented by the first antenna pattern 211 may be electrically connected with each other.

According to various embodiments, the feeding member may be electrically connected with a communication module, e.g., the RF module 350 or the WiFi module 351 or the communication interface 920 as shown in FIG. 9, disposed on the PCB 300. The feeding member connected with the communication module may transmit or receive a signal of a frequency band depending on a signal of the communication module. The first feeding member 221 may be electrically connected with the RF module 350 through the eighth feeding member 228. The first feeding member 221 may transmit or receive a signal of the RF module 350. The second and sixth feeding members 223 and 222 may be electrically connected with the WiFi module 351 through the ninth feeding member 229. The second and sixth feeding members 223 and 222 may transmit or receive a signal of the WiFi module 351. The RF module 350 may be identical with the RF module 929 as shown in FIG. 9. The WiFi module 351 may be identical with the WiFi module 923 as shown in FIG. 9. The RF module 350 may be connected with the first feeding member 221 through, e.g., a contact or feeding line. The WiFi module 351 may be connected with the second or sixth feeding member 223 or 222 through, e.g., a contact or feeding line.

Figure 3B:
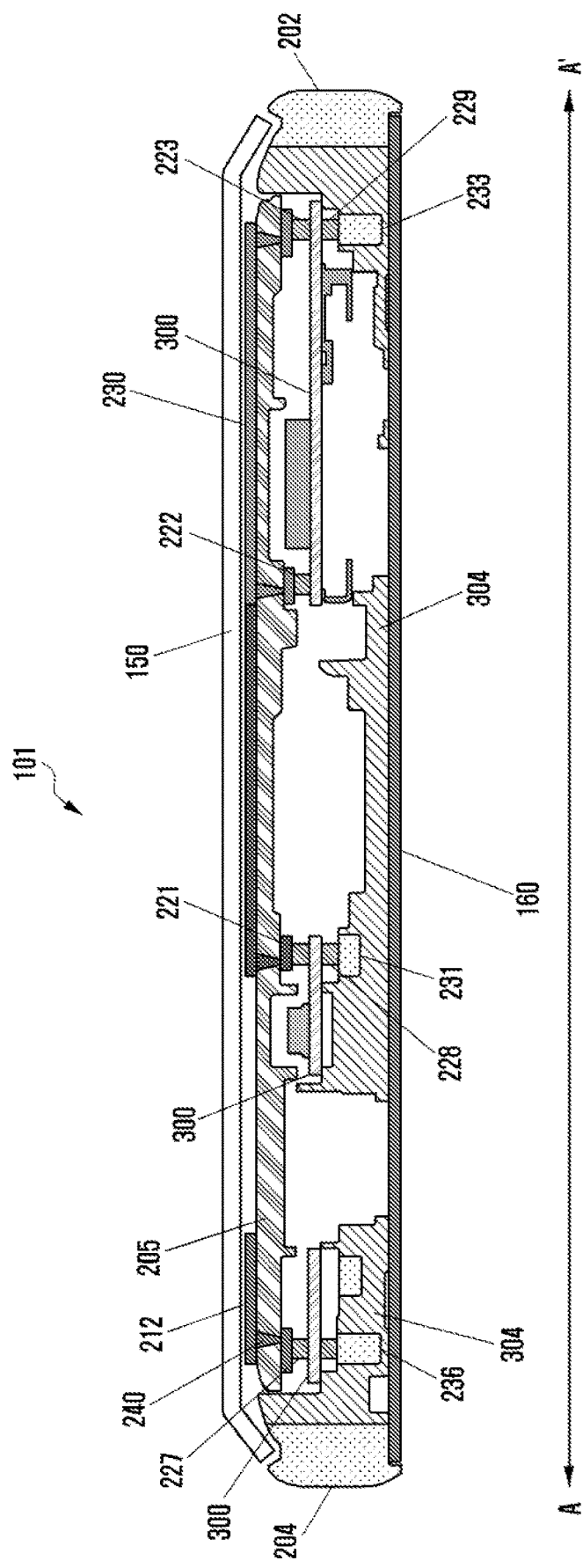
FIG. 3B is a cross-sectional view of an electronic device according to various embodiments of the present disclosure.

FIG. 3B is a cross-sectional view of the electronic device 101 according to various embodiments of the present disclosure. FIG. 3B is a cross-sectional view taken along the line A-A' in FIGS. 1A and 1B.

Referring to FIG. 3B, the PCB 300 may be disposed between the rear cover and the display and have feeding members, contacts, and/or communication modules disposed thereon. The board-type antenna 205 may be electrically connected with the segmented metal frames 201, 202, 203 and 204 and the PCB 300 through such feeding members and contacts. The first feeding member 221 may be electrically connected with the first segmented metal frame 201 through the first contact 231. The board-type antenna 205 and the PCB 300 may be electrically isolated from the segmented metal frames 201, 202, 203 and 204 through the insulating member 304.

According to various embodiments, the second feeding member 223 may be connected with the second segmented metal frame 202 through the second contact 233 so as to use the second segmented metal frame 202 as ground.

According to various embodiments, there is at least one antenna pattern hole 240 for electrical connection between one or more antenna patterns 211, 212, 213 and 230 and one or more feeding members 221, 222, 223 and 227. Such antenna patterns 211, 212, 213 and 230 may be disposed on one side (e.g., in the direction of the rear cover 150) of the board-type antenna 205.

According to various embodiments, the first feeding member 221 may be disposed on one side (e.g., in the direction of the rear cover 150) of the PCB 300, and the eighth feeding member 228 may be disposed on the other side (e.g., in the direction of the display 160) of the PCB 300. The first contact 231 may be disposed on the insulating member 304. The first contact 231 may be electrically connected with the first segmented metal frame 201. The first contact 231 may be electrically connected with an eighth metal frame 208.

According to various embodiments, the second feeding member 223 may be disposed on one side (e.g., in the direction of the rear cover 150) of the PCB 300, and the ninth feeding member 229 may be disposed on the other side (e.g., in the direction of the display 160) of the PCB 300. The second and ninth feeding members 223 and 229 may be electrically connected with each other. The ninth feeding member 229 may be connected with the second segmented metal frame 202. The second feeding member 223 may be connected with an embedded antenna (e.g., a WiFi antenna) implemented by the first antenna pattern 211. The board-type antenna 205 and the second segmented metal frame 202 may be connected with each other through the ninth feeding member 229. An embedded antenna (e.g., a WiFi antenna) implemented by the first antenna pattern 211 may be electrically connected with the second and sixth feeding members 223 and 222. The second contact 233 may be disposed on the insulating member 304. The second contact 233 may be electrically connected with the second segmented metal frame 202. The second contact 233 may be electrically connected with the ninth feeding member 229.

According to various embodiments, the seventh feeding member 227 may be disposed on one side (e.g., in the direction of the rear cover 150) of the PCB 300, and the fifth feeding member 226 may be disposed on the other side (e.g., in the direction of the display 160) of the PCB 300. The fifth and seventh feeding members 226 and 227 may be electrically connected with each other. The fifth feeding member 226 may be connected with the fourth segmented metal frame 204. The seventh feeding member 227 may be connected with an embedded antenna (e.g., a GNSS antenna) implemented by the second antenna pattern 212. The board-type antenna 205 and the second segmented metal frame 202 may be connected with each other through the fifth feeding member 226. The fifth contact 236 may be disposed on the insulating member 304. The fifth contact 236 may be electrically connected with the fourth segmented metal frame 204. The fifth contact 236 may be electrically connected with the fifth feeding member 226.

FIG. 3C is an exploded plan view of the electronic device 101, at a front side, according to various embodiments of the present disclosure.

Referring to FIG. 3C, the first feeding member 221 may be electrically connected with the RF module 350 through the eighth feeding member 228. The second and sixth feeding members 223 and 222 may be electrically connected with the WiFi module 351 through the ninth feeding member 229. The electronic device 101 may further include, on the board-type antenna 205, a ground contact 251 for offering the ground to the first segmented metal frame 201.

Figure 3D:
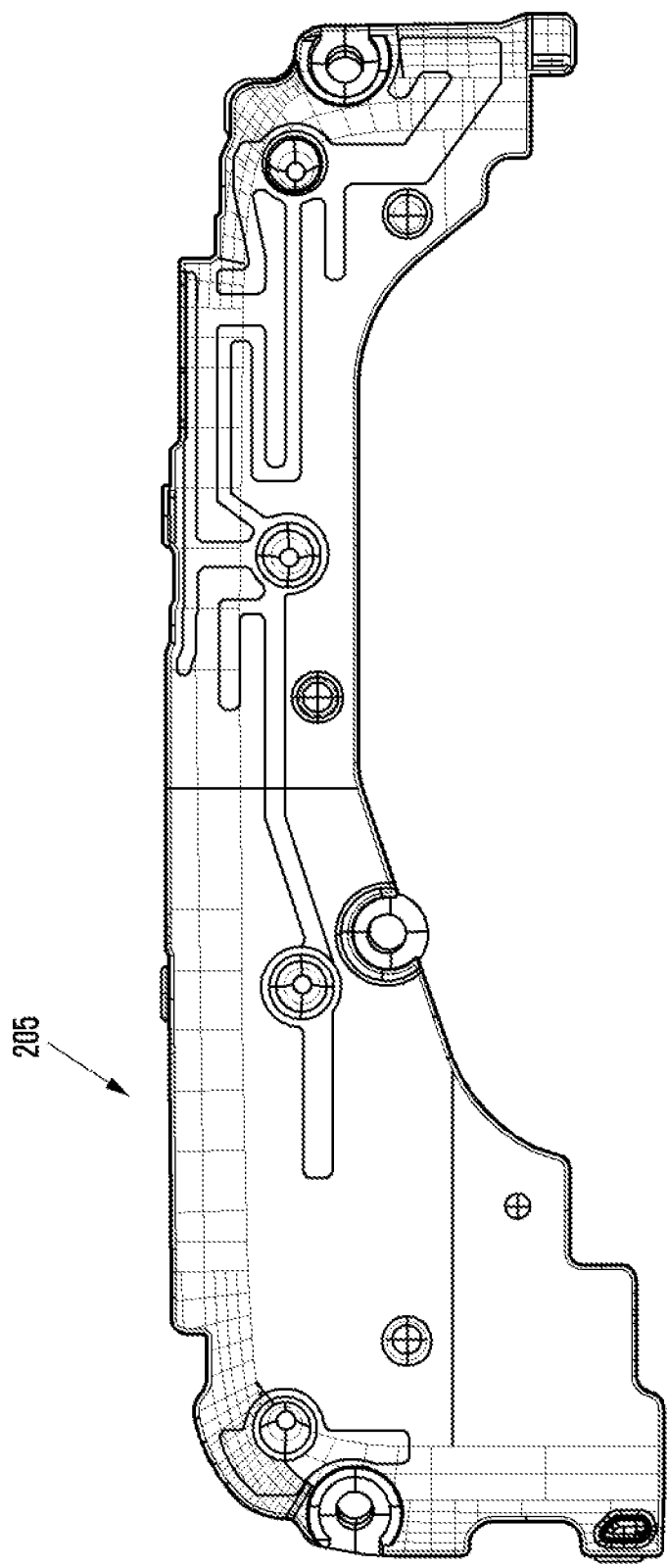
Figure 3E:
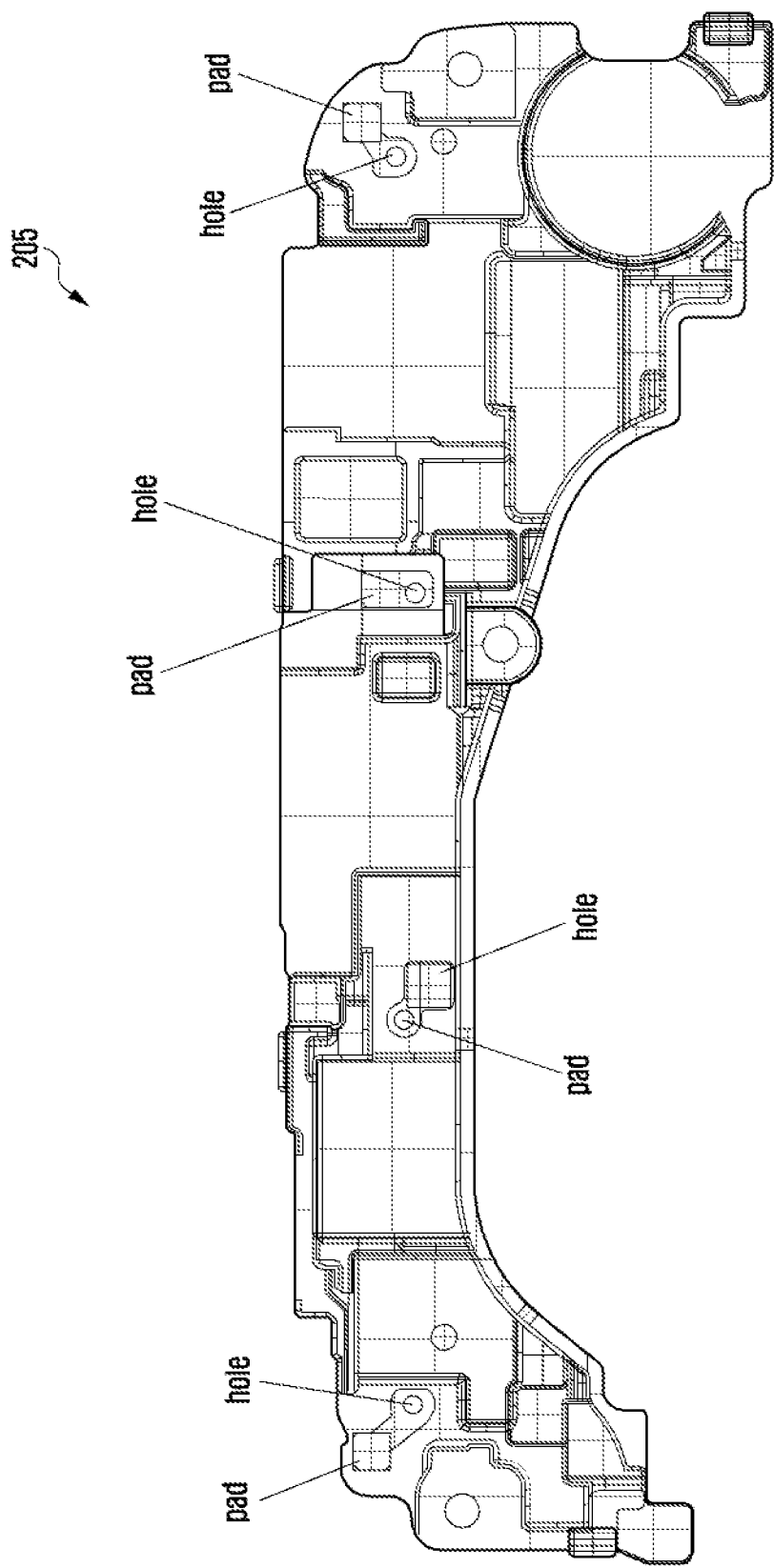

FIGS. 3D, 3E, and 3F are perspective views of the board-type antenna 205 according to various embodiments of the present disclosure.

Referring to FIGS. 3D, 3E, and 3F, the board-type antenna 205 may include at least one antenna pattern hole and pad for electrically connecting one or more antenna patterns 211, 212, 213 and 230 and one or more feeding members 221, 222, 223 and 227.

Figure 3G:
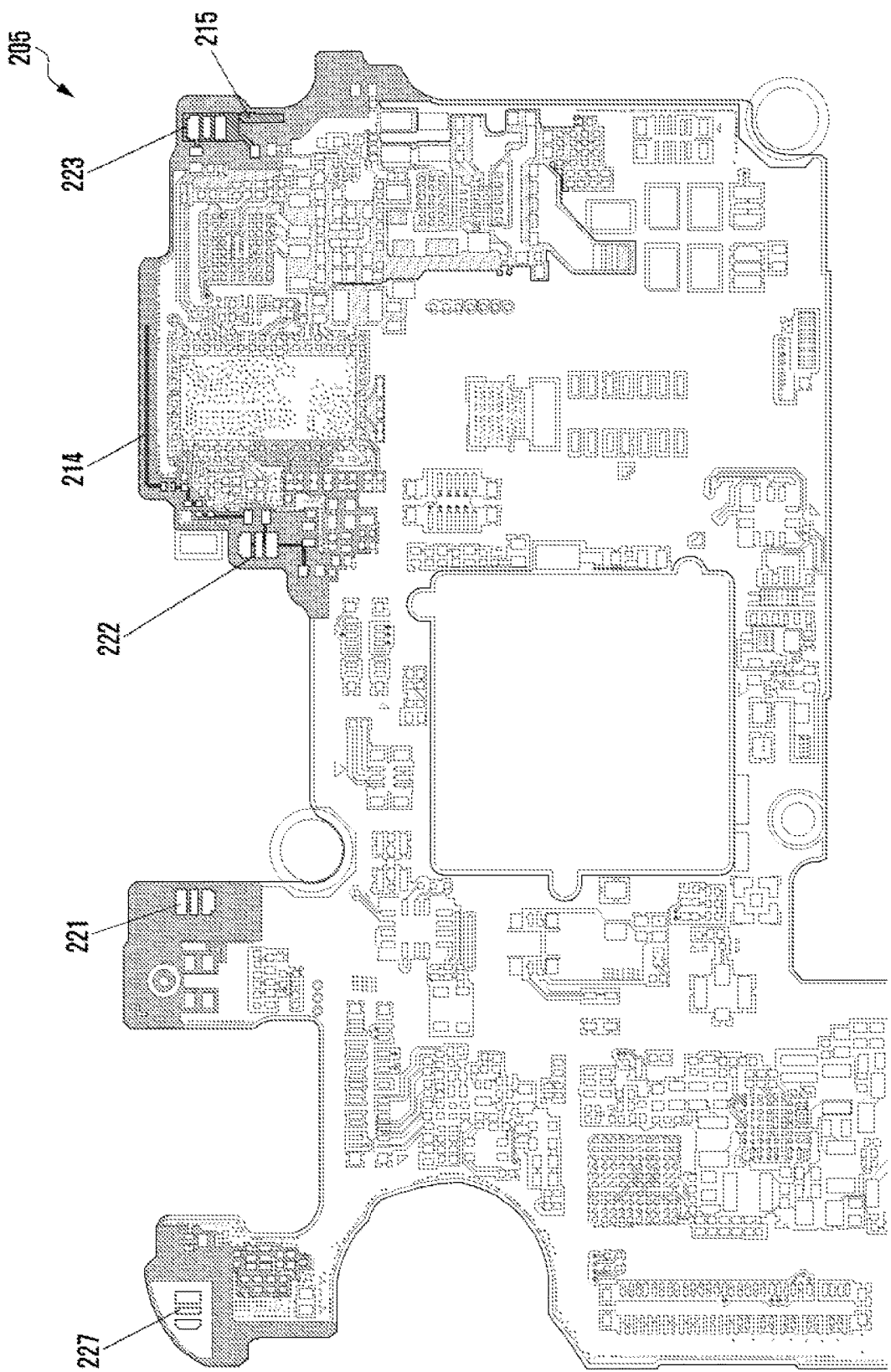
FIG. 3G is a perspective view of a board-type antenna according to various embodiments of the present disclosure.

FIG. 3G is a perspective view of the board-type antenna 205 according to various embodiments of the present disclosure.

Referring to FIG. 3G, the aforementioned PEA is added to the board-type antenna 205. The first PEA 214 may be electrically connected with the first antenna pattern 211 and the antenna connector 230 through the sixth feeding member 222. The second PEA 215 may be electrically connected with the first antenna pattern 211 through the second feeding member 223. When the first and second PEAs 214 and 215 are added, supportable bands of a WiFi antenna pattern implemented by the first antenna pattern 211 may be added.

Figure 4:
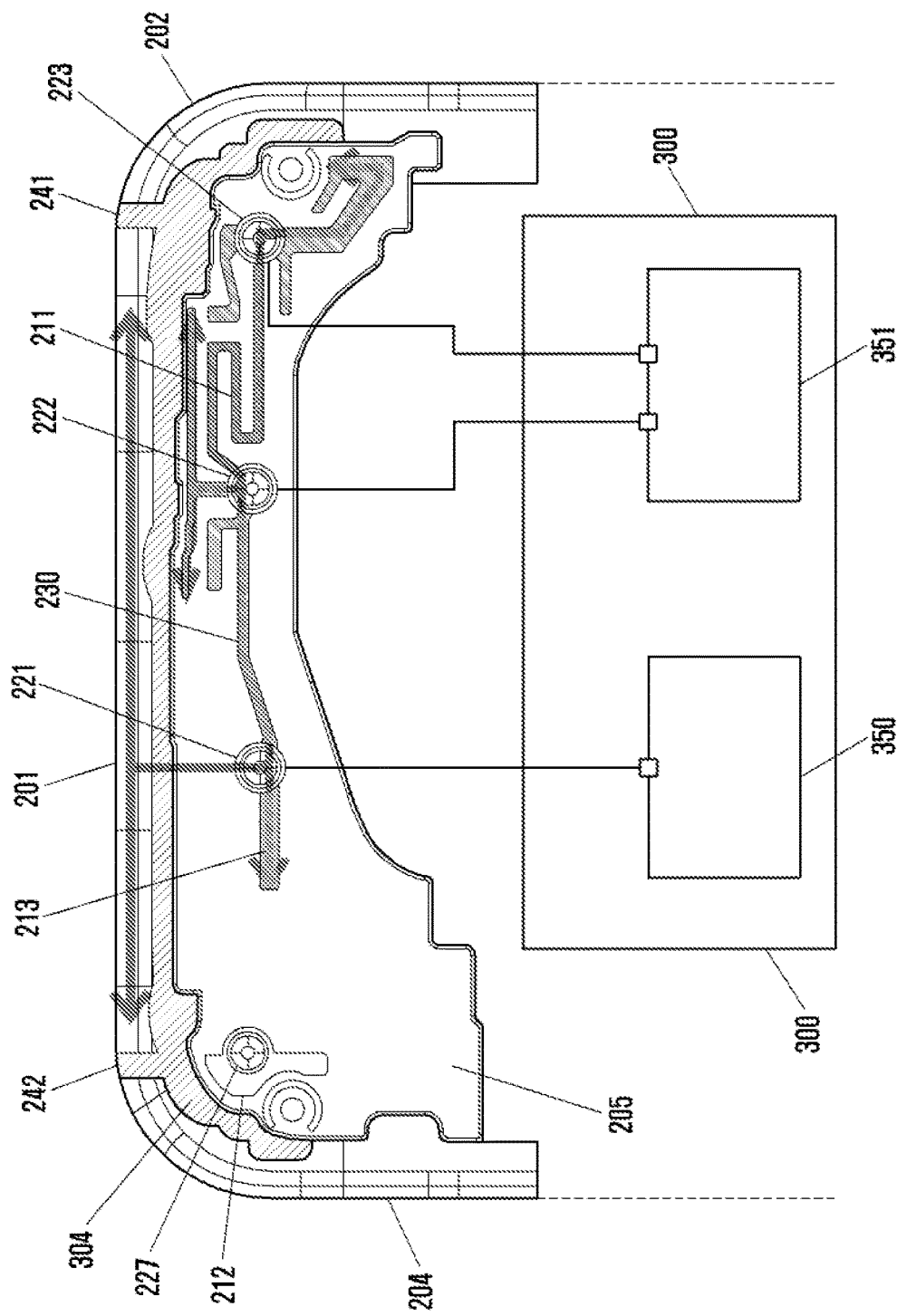
FIG. 4 is a diagram illustrating an RF resonance path according to various embodiments of the present disclosure.

FIG. 4 is a diagram illustrating an RF resonance path according to various embodiments of the present disclosure.

Referring to FIG. 4, when a signal is transmitted or received to or from the first feeding member 221 through the eighth feeding member 228 according to a signal of the RF module 350, a signal transmission and reception region may be expanded to the first segmented metal frame 201, the WiFi antenna implemented by the first antenna pattern 211, the antenna connector 230, and the third antenna pattern 213 which is a stub printed antenna pattern.

According to various embodiments, when a signal of the RF module 350 is delivered to the first feeding member 221 through the eighth feeding member 228, a signal transmission and reception region may be expanded to the first segmented metal frame 201, the WiFi antenna implemented by the first antenna pattern 211, the antenna connector 230, and the third antenna pattern 213 which is a stub printed antenna pattern.

According to various embodiments, a signal received through the first segmented metal frame 201, the WiFi antenna implemented by the first antenna pattern 211, the antenna connector 230, and the third antenna pattern 213 of a stub printed antenna pattern may be delivered to the RF module 350 through the eighth feeding member 228 and the first feeding member 221.

Figure 5:
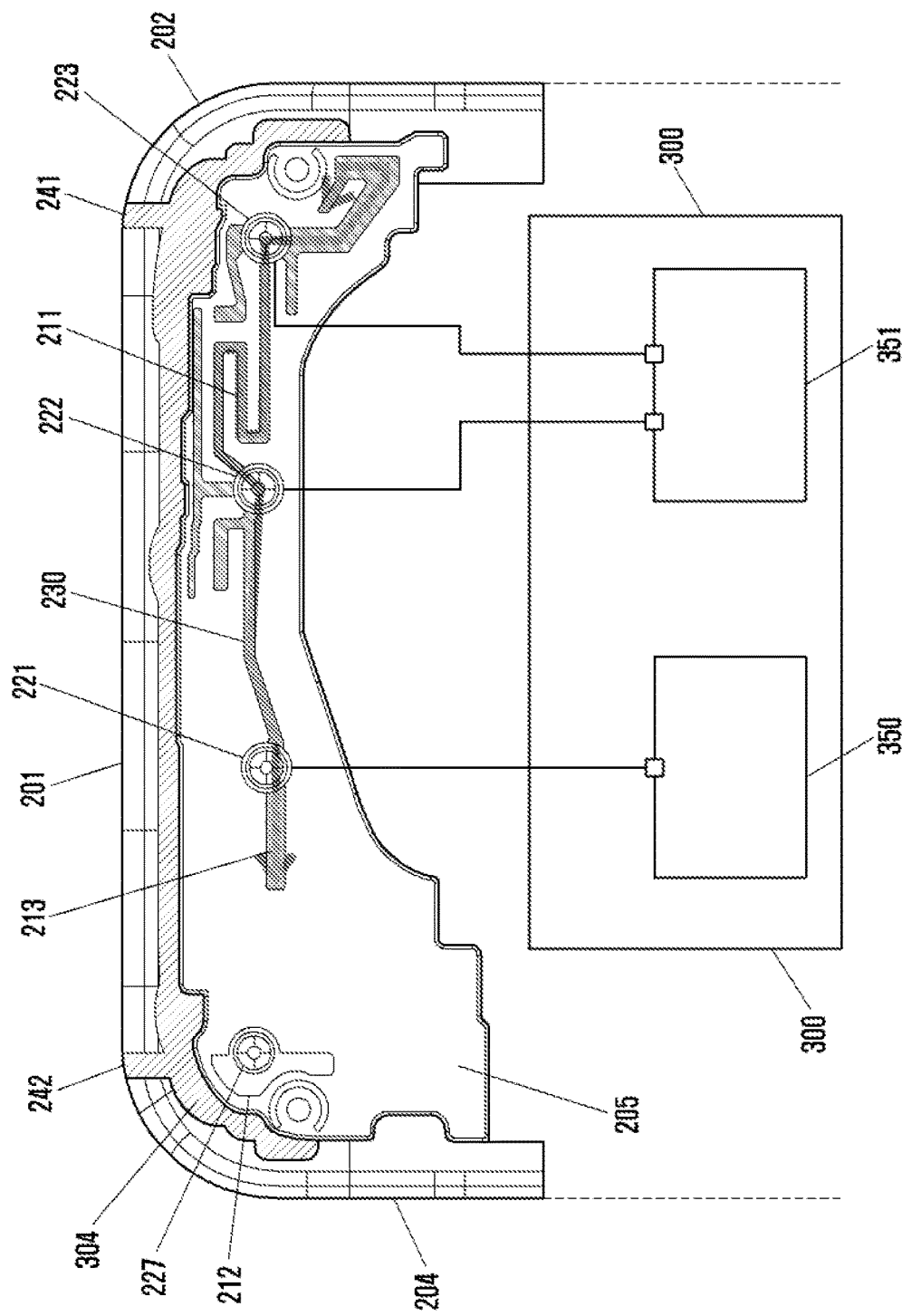
FIG. 5 is a diagram illustrating the first WiFi band resonance path according to various embodiments of the present disclosure.

FIG. 5 is a diagram illustrating the first WiFi band resonance path according to various embodiments of the present disclosure.

Referring to FIG. 5, when a signal is transmitted or received to or from the second and sixth feeding members 223 and 222 through the ninth feeding member 229 according to a signal of the WiFi module 351, a signal transmission and reception region may be expanded to the WiFi antenna implemented by the first antenna pattern 211, the antenna connector 230, and the third antenna pattern 213 which is a stub printed antenna pattern.

According to various embodiments, when a signal of the WiFi module 351 is delivered to the second and sixth feeding members 223 and 222 through the ninth feeding member 229, a signal transmission and reception region may be expanded to the WiFi antenna implemented by the first antenna pattern 211, the antenna connector 230, and the third antenna pattern 213 which is a stub printed antenna pattern.

According to various embodiments, a signal received through the WiFi antenna implemented by the first antenna pattern 211, the antenna connector 230, and the third antenna pattern 213 of a stub printed antenna pattern may be delivered to the WiFi module 351 through the second feeding member 223 and the sixth feeding member 222.

Figure 6:
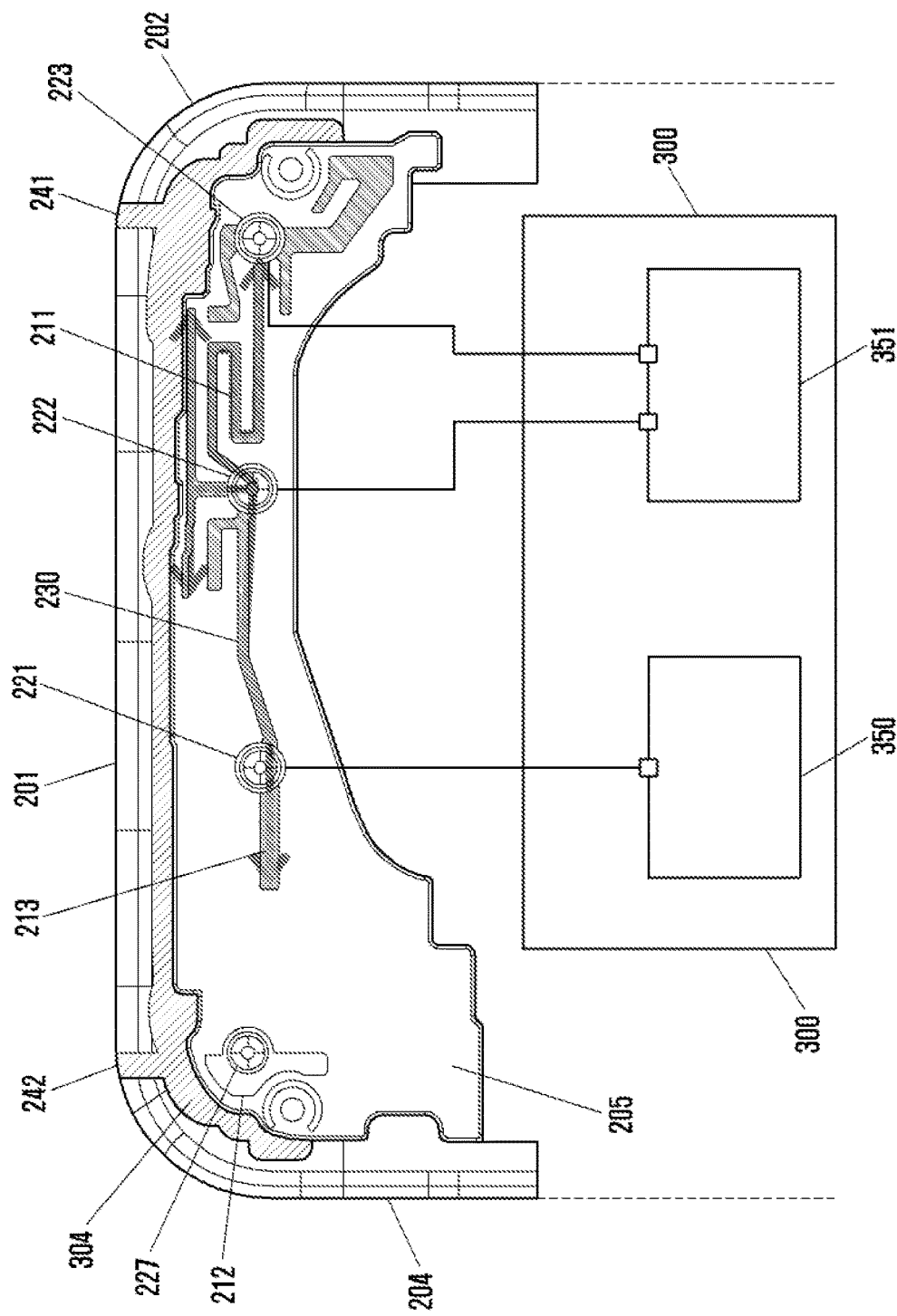
FIG. 6 is a diagram illustrating the second WiFi band resonance path according to various embodiments of the present disclosure.

FIG. 6 is a diagram illustrating the second WiFi band resonance path according to various embodiments of the present disclosure.

Referring to FIG. 6, when a signal is transmitted or received to or from the second and sixth feeding members 223 and 222 through the ninth feeding member 229 according to a signal of the WiFi module 351, a signal transmission and reception region may be expanded to the WiFi antenna implemented by the first antenna pattern 211, the antenna connector 230, and the third antenna pattern 213 which is a stub printed antenna pattern.

According to various embodiments, when a signal of the WiFi module 351 is delivered to the second and sixth feeding members 223 and 222 through the ninth feeding member 229, a signal transmission and reception region may be expanded to the WiFi antenna implemented by the first antenna pattern 211, the antenna connector 230, and the third antenna pattern 213 which is a stub printed antenna pattern.

According to various embodiments, a signal received through the WiFi antenna implemented by the first antenna pattern 211, the antenna connector 230, and the third antenna pattern 213 of a stub printed antenna pattern may be delivered to the WiFi module 351 through the second feeding member 223 and the sixth feeding member 222.

Figure 7A:
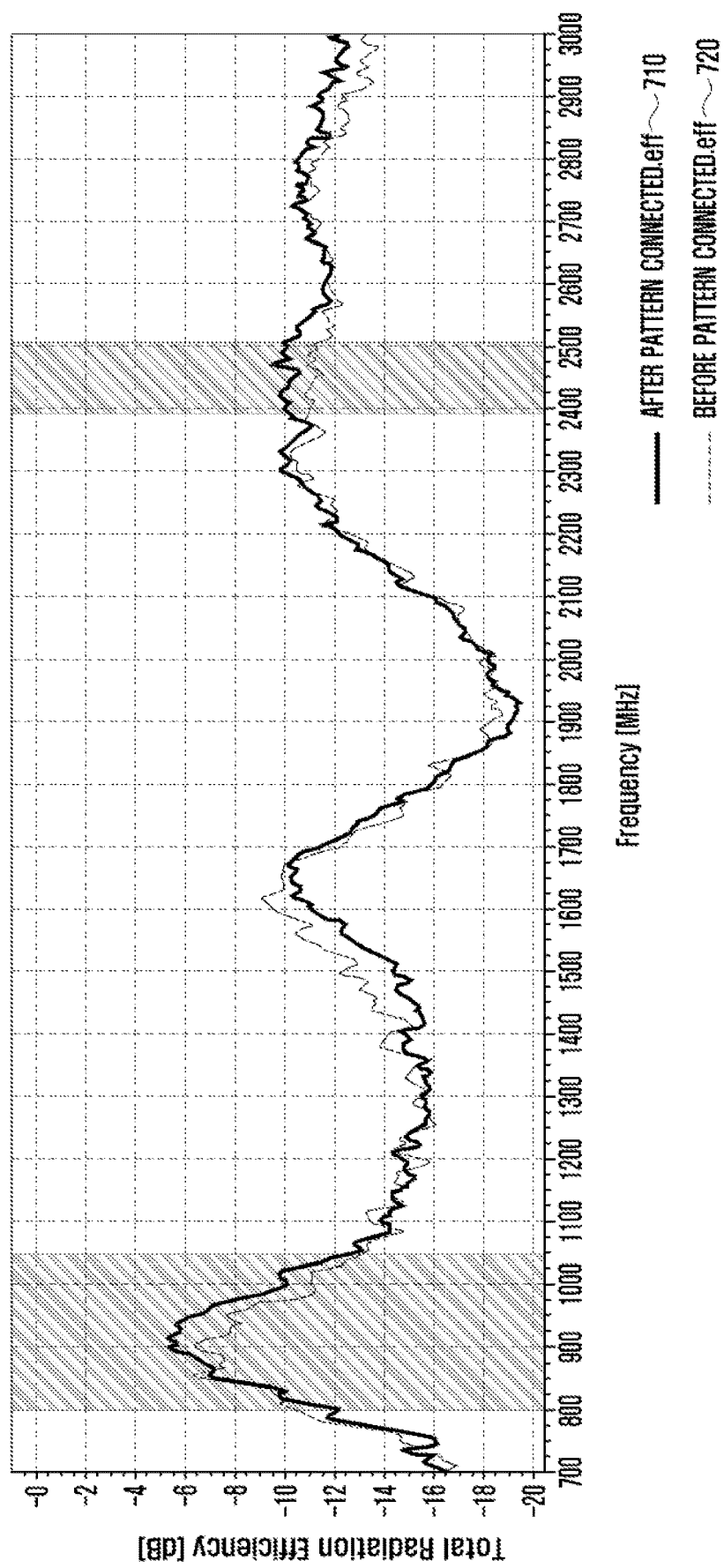
FIGS. 7A, 7B, 7C, 7D, 7E, and 7F are graphs illustrating frequency efficiency characteristics of an antenna according to various embodiments of the present disclosure.

FIG. 7A is a graph illustrating frequency efficiency characteristics of an antenna according to various embodiments of the present disclosure.

FIG. 7A shows that the radiation efficiency is increased at the frequency band of the RF module 350, e.g., 800~1050 MHz, after connection of the first and sixth feeding members 221 and 222 through the antenna connector 230 (as indicated by a reference numeral 710) than before (as indicated by a reference numeral 720).

Additionally, Table 1 shows such increases in the radiation efficiency of the RF module 350.

TABLE 1

|  | LTE B5 Tx | | LTE B5 Rx | | LTE B8 Rx |
| --- | --- | --- | --- | --- | --- |
| Spec (dBm) | — | | | −92 | −90 |
| Frequency (MHz) | 834 | 844 | 879 | 889 | 955 |
| Before connection | 15 | 15.7 | −91.5 | −91.2 | −88 |
| After connection | 15.8 | 16.5 | −92.3 | −92.3 | −90.5 |
| Delta value | 0.8 | 0.8 | 0.8 | 1.1 | 2.5 |

Figure 7B:
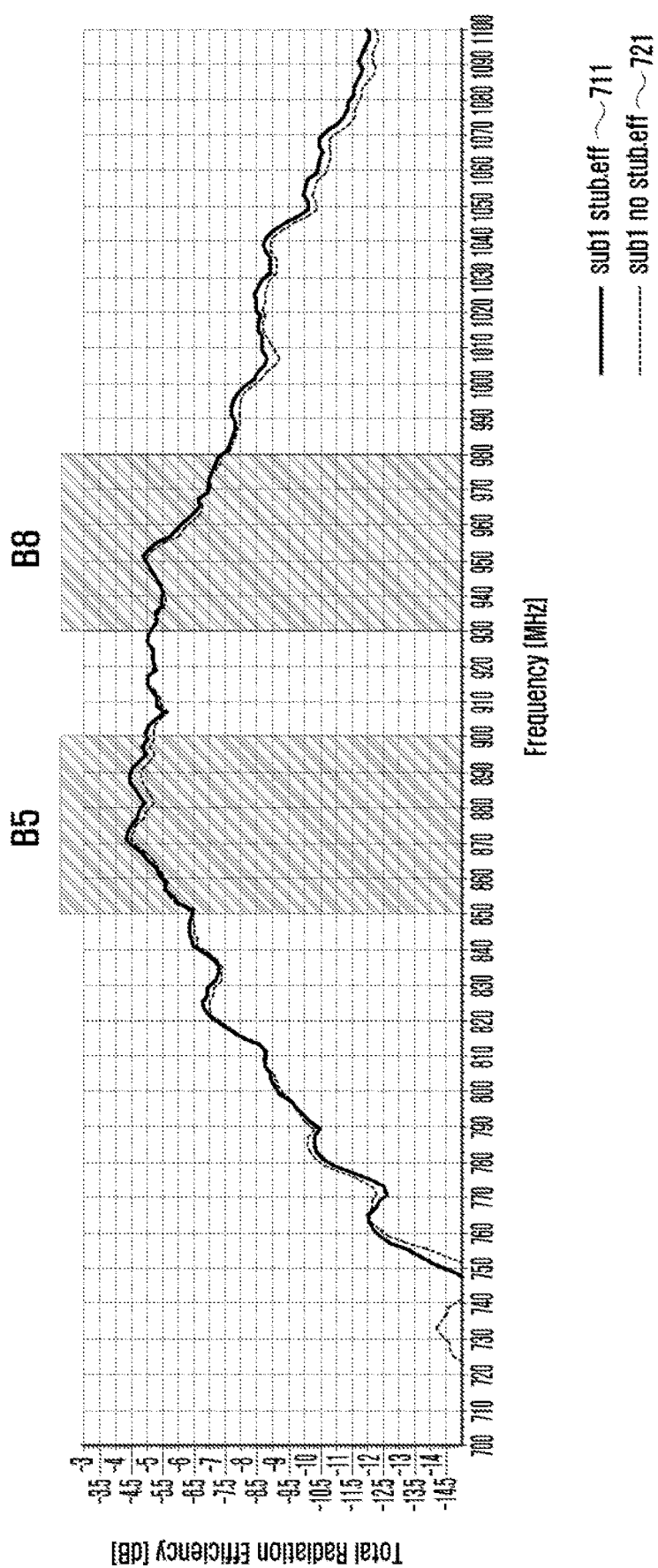

FIG. 7B is another graph illustrating frequency efficiency characteristics of an antenna according to various embodiments of the present disclosure.

FIG. 7B shows that the radiation efficiency is increased at the frequency band of the RF module 350, e.g., 800~1050 MHz, after connection of the antenna connector 230 and the third antenna pattern 213 of a stub printed antenna pattern (as indicated by a reference numeral 711) than before (as indicated by a reference numeral 721).

Figure 7C:
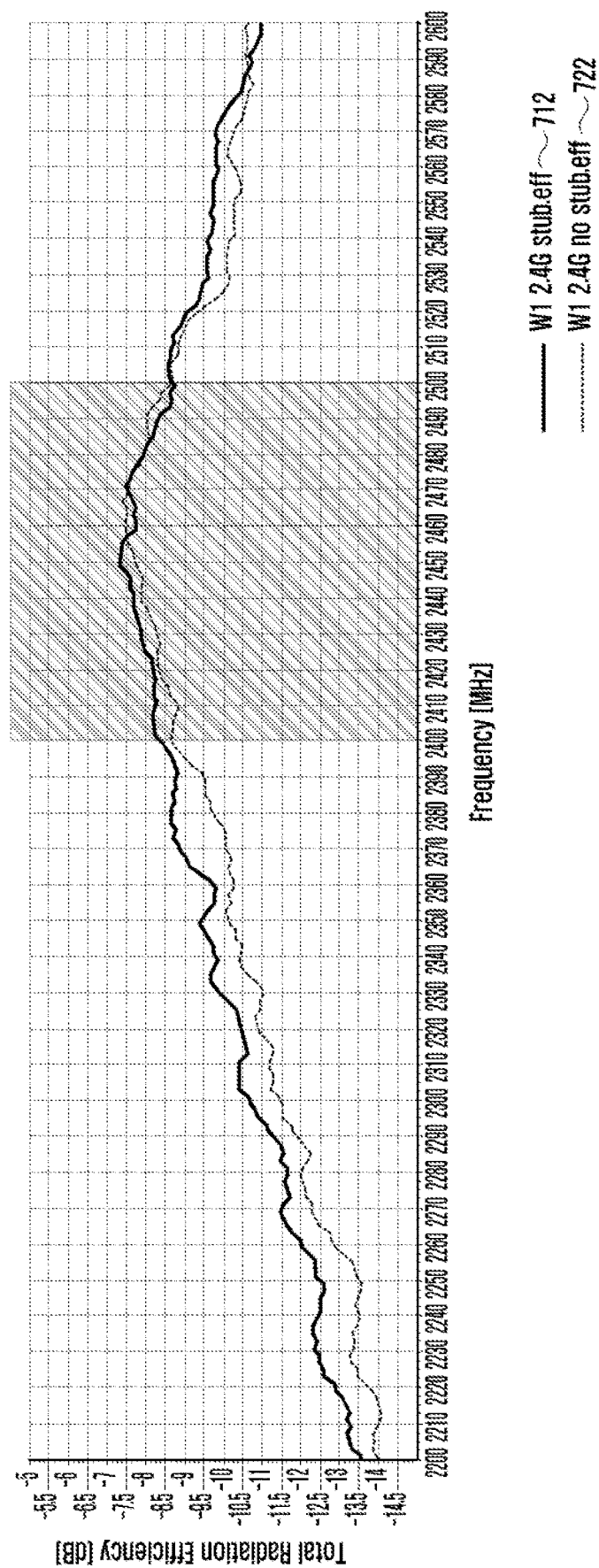

FIG. 7C is still another graph illustrating frequency efficiency characteristics of an antenna according to various embodiments of the present disclosure.

FIG. 7C shows that the radiation efficiency is increased at the frequency band of the WiFi module 351, e.g., a 2.4 GHz band (i.e., 2.401~2.495 GHz), after connection of the antenna connector 230 and the third antenna pattern 213 of a stub printed antenna pattern (as indicated by a reference numeral 712) than before (as indicated by a reference numeral 722).

Figure 7D:
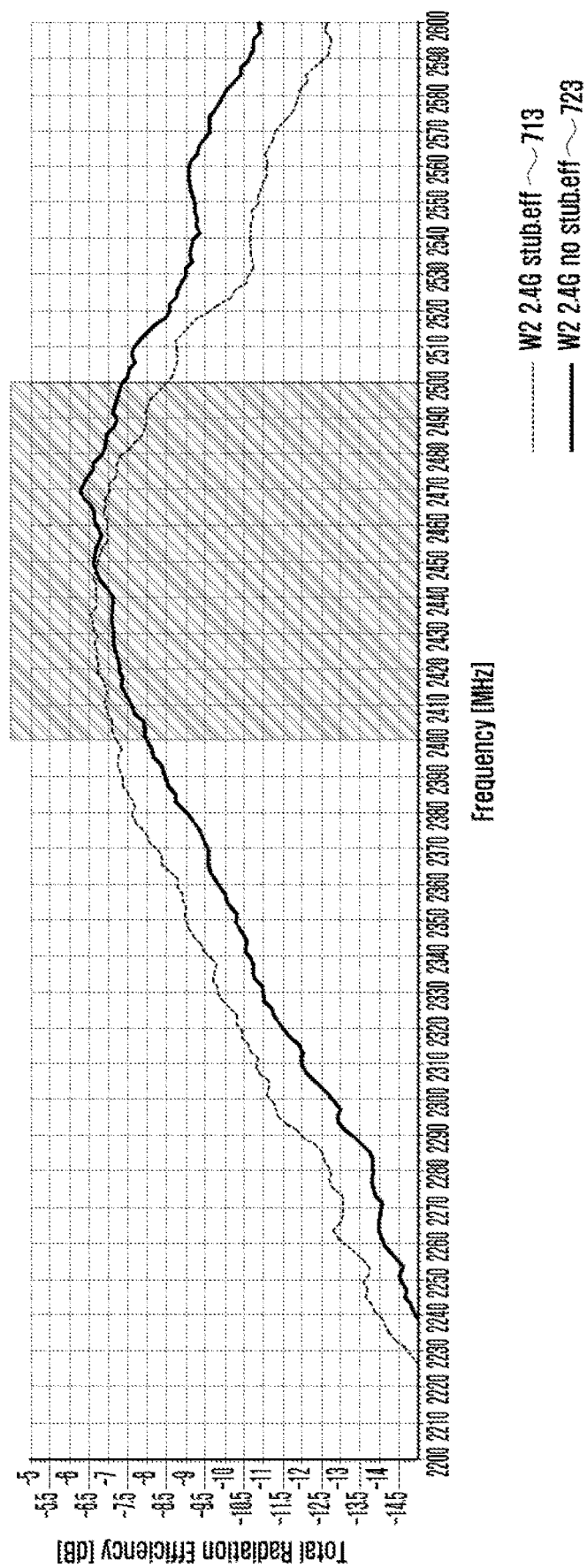

FIG. 7D is yet another graph illustrating frequency efficiency characteristics of an antenna according to various embodiments of the present disclosure.

FIG. 7D shows that the radiation efficiency is increased at the frequency band of the WiFi module 351, e.g., a 2.4 GHz band (i.e., 2.401~2.495 GHz), after connection of the antenna connector 230 and the third antenna pattern 213 of a stub printed antenna pattern (as indicated by a reference numeral 713) than before (as indicated by a reference numeral 723).

Additionally, Table 2 shows increases in the radiation efficiency of the WiFi module 351 after connection of the first and sixth feeding members 221 and 222 through the antenna connector 230 and the third antenna pattern 213 of a stub printed antenna pattern (as indicated by a reference numeral 713) than before (as indicated by a reference numeral 723).

TABLE 2

|  | 802.11b (2.4 GHz) | | |
| --- | --- | --- | --- |
| Spec (dBm) | | 14 | |
| Frequency (MHz) | 2402 | 2327 | 2462 |
| Before connection | 13.78 | 12.03 | 14.03 |
| After connection | 14 | 14.7 | 14.7 |
| Delta value | 0.22 | 2.67 | 0.67 |

Figure 7E:
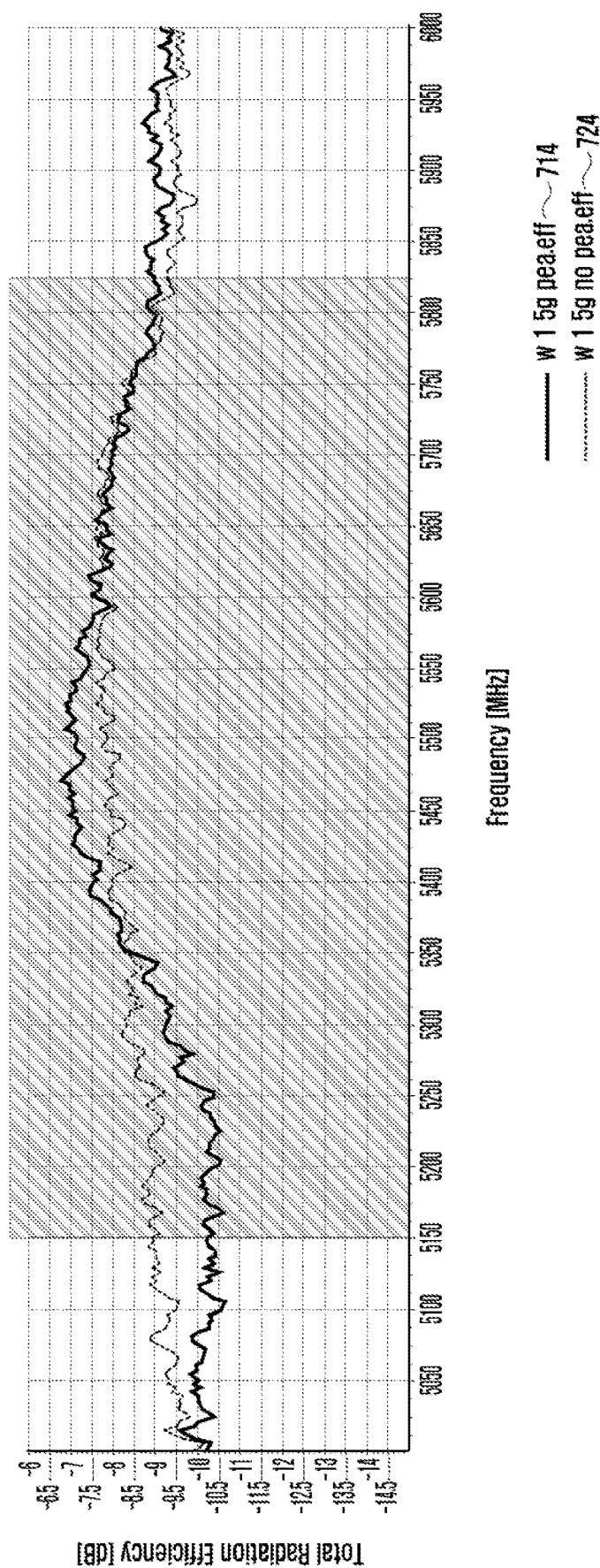

FIG. 7E is yet another graph illustrating frequency efficiency characteristics of an antenna according to various embodiments of the present disclosure.

If the PEA is added to the board-type antenna 205, the radiation efficiency may be increased at the frequency band of the WiFi module 351, e.g., a 5 GHz band (i.e., 5.15~5.825 GHz). FIG. 7E shows that the radiation efficiency is increased after the first and second PEAs 214 and 215 are connected with the second and sixth feeding members 223 and 222, respectively, (as indicated by a reference numeral 714) than before (as indicated by a reference numeral 724).

Figure 7F:
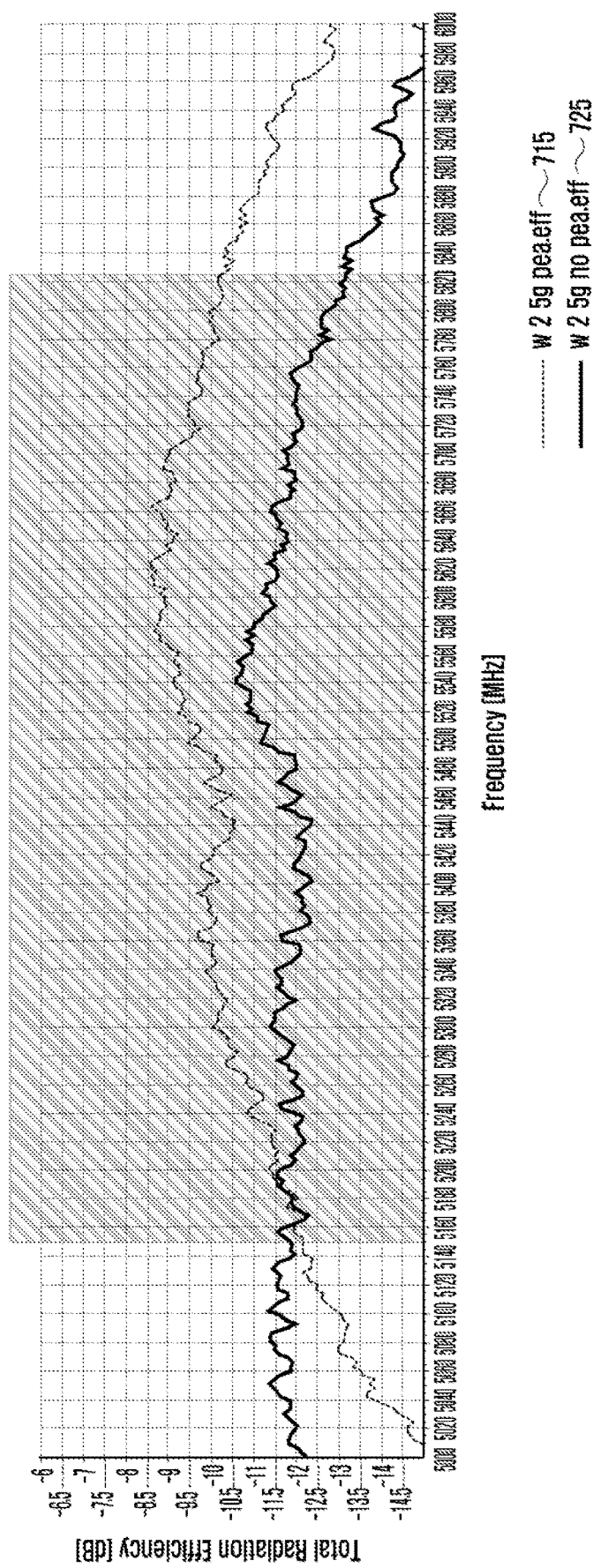

FIG. 7F is yet another graph illustrating frequency efficiency characteristics of an antenna according to various embodiments of the present disclosure.

FIG. 7F shows that the radiation efficiency is increased at the frequency band of the WiFi module 351, e.g., a 5 GHz band (i.e., 5.15~5.825 GHz), after connection of the antenna connector 230 and the third antenna pattern 213 of a stub printed antenna pattern (as indicated by a reference numeral 715) than before (as indicated by a reference numeral 725).

Figure 8:
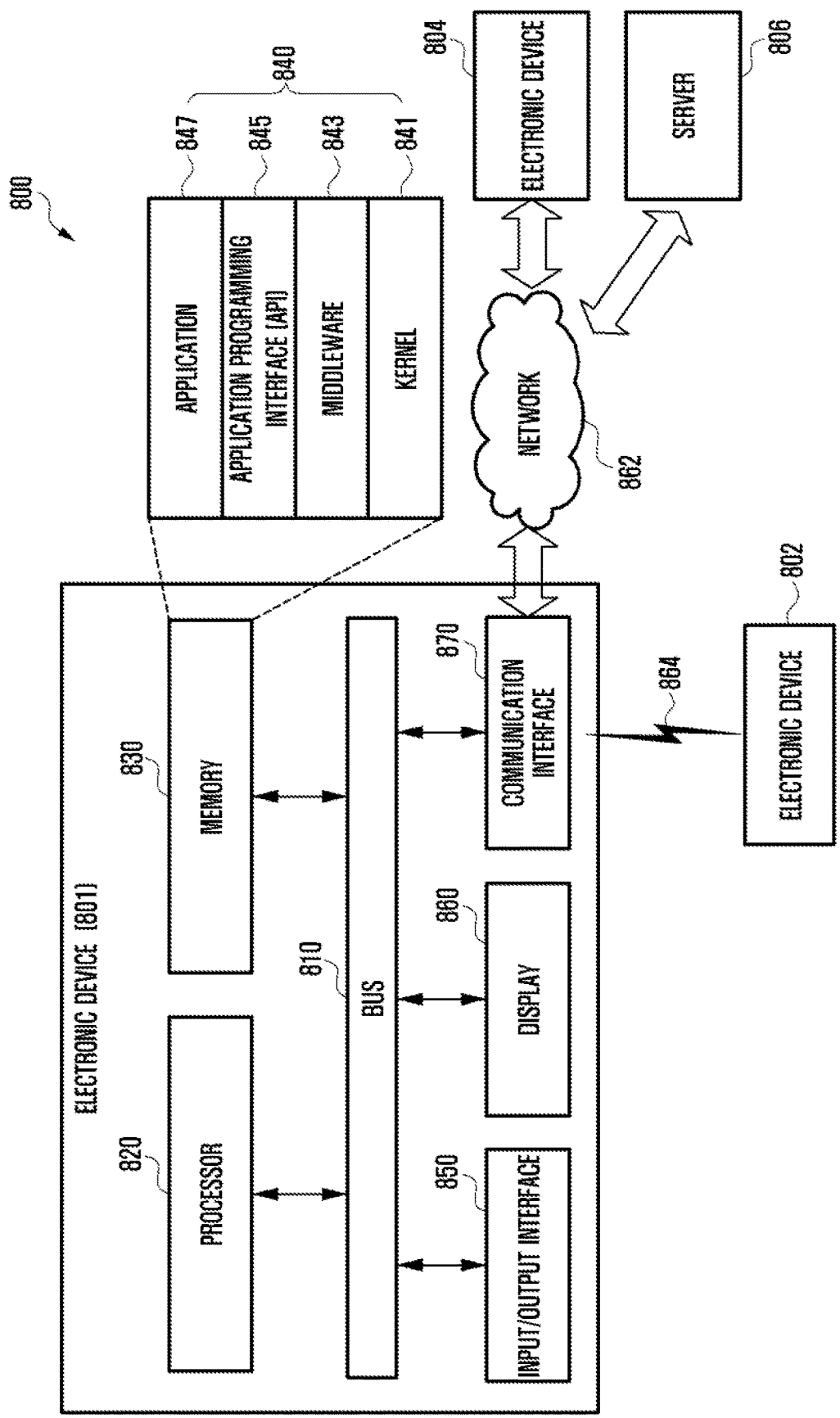
FIG. 8 is a block diagram illustrating an electronic device in a network environment according to various embodiments of the present disclosure.

FIG. 8 illustrates a network environment 800 including an electronic device 801 according to various embodiments of the present disclosure. Referring to FIG. 8, the electronic device 801 includes a bus 810, a processor 820, a memory 830, an input/output interface 850, a display 860 and a communication interface 870.

Referring to FIG. 8, the bus 810 may be a circuit connecting the above described components and transmitting communication (for example, a control message) between the above described components. The processor 820 receives commands from other components (for example, the memory 830, the input/output interface 850, the display 860, the communication interface 870) through the bus 810, analyzes the received commands, and executes calculation or data processing according to the analyzed commands. The memory 830 stores commands or data received from the processor 820 or other components (for example, the input/output interface 850, the display 860, or the communication interface 870) or generated by the processor 820 or other components. The memory 830 may include programming modules 840, for example, a kernel 841, middleware 843, an application programming interface (API) 845, and an application 847. Each of the aforementioned programming modules may be implemented by software, firmware, hardware, or a combination of two or more thereof.

The kernel 841 controls or manages system resources (for example, the bus 810, the processor 820, or the memory 830) used for executing an operation or function implemented by the remaining other programming modules, for example, the middleware 843, the API 845, or the application 847. Further, the kernel 841 provides an interface for accessing individual components of the electronic device 801 from the middleware 843, the API 845, or the application 847 to control or manage the components. The middleware 843 performs a relay function of allowing the API 845 or the application 847 to communicate with the kernel 841 to exchange data. Further, in operation requests received from the application 847, the middleware 843 performs a control for the operation requests (for example, scheduling or load balancing) by using a method of assigning a priority, by which system resources (for example, the bus 810, the processor 820, the memory 830 and the like) of the electronic device 801 can be used, to the application 834.

The API 845 is an interface by which the application 847 can control a function provided by the kernel 841 or the middleware 843 and includes, for example, at least one interface or function (for example, command) for a file control, a window control, image processing, or a character control. The input/output interface 850 can receive, for example, a command and/or data from a user, and transfer the received command and/or data to the processor 820 and/or the memory 830 through the bus 810. The display 860 can display an image, a video, and/or data to a user.

According to an embodiment, the display 860 may display a graphic user interface image for interaction between the user and the electronic device 801. According to various embodiments, the graphic user interface image may include interface information to activate a function for correcting color of the image to be projected onto the screen. The interface information may be in the form of, for example, a button, a menu, or an icon. The communication interface 870 connects communication between the electronic device 801 and the external device (for example, electronic device 802, 804 or server 806). For example, the communication interface 870 may access a network 862 through wireless or wired communication to communicate with the external device, or may communicate directly through, for example, wireless link 864. The wireless communication includes at least one of, for example, WiFi, BT, near field communication (NFC), a global positioning system (GPS), and cellular communication (for example, LTE, LTE-advanced (LTE-A), CDMA, WCDMA, universal mobile telecommunications system (UMTS), wireless broadband (WiBro) or global system for mobile communication (GSM)). The wired communication may include at least one of, for example, a universal serial bus (USB), a high definition multimedia interface (HDMI), recommended standard 232 (RS-232), and a plain old telephone service (POTS).

According to an embodiment, the server 806 supports driving of the electronic device 801 by performing at least one operation (or function) implemented by the electronic device 801. For example, the server 806 may include a communication control server module that supports the communication interface 870 implemented in the electronic device 801. For example, the communication control server module may include at least one of the components of the communication interface 870 to perform (on behalf of) at least one operations performed by the communication interface 870.

FIG. 9 is a block diagram of an electronic device 901 according to various embodiments of the present disclosure. The electronic device 901 may configure, for example, a whole or a part of the electronic device 801 illustrated in FIG. 8. Referring to FIG. 9, the electronic device 801 includes one or more APs 910, a communication interface 920, a SIM card 924, a memory 930, a sensor module 940, an input device 950, a display module 960, an interface 970, an audio module 980, a camera module 991, a power managing module 995, a battery 996, an indicator 997, and a motor 998.

The AP 910 operates an operating system (OS) or an application program so as to control a plurality of hardware or software component elements connected to the AP 910 and execute various data processing and calculations including multimedia data. The AP 910 may be implemented by, for example, a system on chip (SoC). According to an embodiment, the processor 910 may further include a graphic processing unit (GPU).

The communication interface 920 (for example, communication interface 870) transmits/receives data in communication between different electronic devices (for example, the electronic device 804 and the server 806) connected to the electronic device 901 (for example, electronic device 801) through a network. According to an embodiment, the communication interface 920 includes a cellular module 921, a WiFi module 923, a BT module 925, a GNSS module 927, an NFC module 928, and a radio frequency (RF) module 929.

The cellular module 921 provides a voice, a call, a video call, a short message service (SMS), or an Internet service through a communication network (for example, LTE, LTE-A, CDMA, WCDMA, UMTS, WiBro, GSM or the like). Further, the cellular module 921 may distinguish and authenticate electronic devices within a communication network by using a subscriber identification module (for example, the SIM card 924). According to an embodiment, the cellular module 921 performs at least some of the functions which can be provided by the AP 910. For example, the cellular module 921 may perform at least some of the multimedia control functions.

According to an embodiment, the cellular module 921 may include a communication processor (CP). Further, the cellular module 921 may be implemented by, for example, an SoC.

According to an embodiment, the AP 910 or the cellular module 921 (for example, CP) may load a command or data received from at least one of a non-volatile memory and other components connected to each of the AP 910 and the cellular module 921 to a volatile memory and process the loaded command or data. Further, the AP 910 or the cellular module 921 may store data received from at least one of other components or generated by at least one of other components in a non-volatile memory.

Each of the WiFi module 923, the BT module 925, the GNSS module 927, and the NFC module 928 may include, for example, a processor for processing data transmitted/received through the corresponding module. Although the cellular module 921, the WiFi module 923, the BT module 925, the GNSS module 927, and the NFC module 928 are illustrated as blocks separate from each other in FIG. 9, at least some (for example, two or more) of the cellular module 921, the WiFi module 923, the BT module 925, the GNSS module 927, and the NFC module 928 may be included in one integrated chip (IC) or one IC package according to one embodiment. For example, at least some (for example, the CP corresponding to the cellular module 921 and the WiFi processor corresponding to the WiFi module 923) of the processors corresponding to the cellular module 921, the WiFi module 923, the BT module 925, the GNSS module 927, and the NFC module 928 may be implemented by one SoC.

The RF module 929 transmits/receives data, for example, an RF signal. Although not illustrated, the RF module 929 may include, for example, a transceiver, a power amp module (PAM), a frequency filter, a low noise amplifier (LNA) or the like. Further, the RF module 929 may further include a component for transmitting/receiving electronic waves over a free air space in wireless communication, for example, a conductor, a conducting wire, or the like. Although the cellular module 921, the WiFi module 923, the BT module 925, the GNSS module 927, and the NFC module 928 share one RF module 929 in FIG. 8, at least one of the cellular module 921, the WiFi module 923, the BT module 925, the GNSS module 927, and the NFC module 928 may transmit/receive an RF signal through a separate RF module according to one embodiment.

The SIM card 924 is a card including a Subscriber Identification Module and may be inserted into a slot formed in a particular portion of the electronic device. The SIM card 924 includes unique identification information (for example, integrated circuit card identifier (ICCID)) or subscriber information (for example, international mobile subscriber identity (IMSI)).

The memory 930 (for example, memory 830) may include an internal memory 939 or an external memory 934. The internal memory 939 may include, for example, at least one of a volatile memory (for example, a random access memory (RAM), a dynamic RAM (DRAM), a static RAM (SRAM), a synchronous dynamic RAM (SDRAM), and the like), and a non-volatile memory (for example, a Read Only Memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 939 may be a solid state drive (SSD). The external memory 934 may further include a flash drive, for example, a compact flash (CF), an SD, a micro-SD, a mini-SD, an extreme Digital (xD), or a memory stick. The external memory 934 may be functionally connected to the electronic device 901 through various interfaces. According to an embodiment, the electronic device 901 may further include a storage device (or storage medium) such as a hard drive.

The sensor module 940 measures a physical quantity or detects an operation state of the electronic device 901, and converts the measured or detected information to an electronic signal. The sensor module 940 may include, for example, at least one of a gesture sensor 940A, a gyro sensor 940B, an atmospheric pressure (barometric) sensor 940C, a magnetic sensor 940D, an acceleration sensor 940E, a grip sensor 940F, a proximity sensor 940G, a color sensor 940H (for example, red, green, and blue (RGB) sensor) 940H, a biometric sensor 940I, a temperature/humidity sensor 940J, an illumination (light) sensor 940K, and an ultra violet (UV) sensor 940M. Additionally or alternatively, the sensor module 940 may include, for example, a E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 940 may further include a control circuit for controlling one or more sensors included in the sensor module 940.

The input device 950 includes a touch panel 952, a (digital) pen sensor 954, a key 956, and an ultrasonic input device 958. For example, the touch panel 952 may recognize a touch input in at least one type of a capacitive type, a resistive type, an infrared type, and an acoustic wave type. The touch panel 952 may further include a control circuit. In the capacitive type, the touch panel 952 can recognize proximity as well as a direct touch. The touch panel 952 may further include a tactile layer. In this event, the touch panel 952 provides a tactile reaction to the user.

The (digital) pen sensor 954 may be implemented, for example, using a method identical or similar to a method of receiving a touch input of the user, or using a separate recognition sheet. The key 956 may include, for example, a physical button, an optical key, or a key pad. The ultrasonic input device 958 is a device which can detect an acoustic wave by a microphone (for example, microphone 988) of the electronic device 901 through an input means generating an ultrasonic signal to identify data and can perform wireless recognition. According to an embodiment, the electronic device 901 receives a user input from an external device (for example, computer or server) connected to the electronic device 901 by using the communication interface 920.

The display 960 (for example, display 860) includes a panel 962, a hologram device 964, and a projector 966. The panel 962 may be, for example, a liquid crystal display (LCD) or an active matrix organic light emitting diode (AM-OLED). The panel 962 may be implemented to be, for example, flexible, transparent, or wearable. The panel 262 may be configured by the touch panel 952 and one module. The hologram device 964 shows a stereoscopic image in the air by using interference of light. The projector 966 projects light on a screen to display an image. For example, the screen may be located inside or outside the electronic device 901. According to an embodiment, the display 960 may further include a control circuit for controlling the panel 962, the hologram device 964, and the projector 966.

The interface 970 includes, for example, an HDMI 972, a USB 974, an optical interface 976, and a D-subminiature (D-sub) 978. The interface 970 may be included in, for example, the communication interface 870 illustrated in FIG. 8. Additionally or alternatively, the interface 970 may include, for example, a mobile high-definition link (MHL) interface, a SD card/multi-media card (MMC), or an Infrared data association (IrDA) standard interface.

The audio module 980 bi-directionally converts a sound and an electronic signal. At least some components of the audio module 980 may be included in, for example, the input/output interface 850 illustrated in FIG. 8. The audio module 980 processes sound information input or output through, for example, a speaker 982, a receiver 984, an earphone 986, the microphone 988 or the like.

The camera module 991 is a device which can photograph a still image and a video. According to an embodiment, the camera module 991 may include one or more image sensors (for example, a front sensor or a back sensor), an image signal processor (ISP) (not shown) or a flash (for example, an LED or xenon lamp).

The power managing module 995 manages power of the electronic device 901. Although not illustrated, the power managing module 995 may include, for example, a power management integrated circuit (PMIC), a charger integrated circuit (IC), or a battery or fuel gauge.

The PMIC may be mounted to, for example, an IC or an SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 996, or a voltage, a current, or a temperature during charging. The battery 996 may store or generate electricity and supply power to the electronic device 901 by using the stored or generated electricity. The battery 996 may include a rechargeable battery or a solar battery. The indicator 997 shows particular statuses of the electronic device 901 or a part (for example, AP 910) of the electronic device 901, for example, a booting status, a message status, a charging status and the like. The motor 998 converts an electrical signal to a mechanical vibration.

Although not illustrated, the electronic device 901 may include a processing unit (for example, GPU) for supporting a module TV. The processing unit for supporting the mobile TV may process, for example, media data according to a standard of digital multimedia broadcasting (DMB), digital video broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 10:
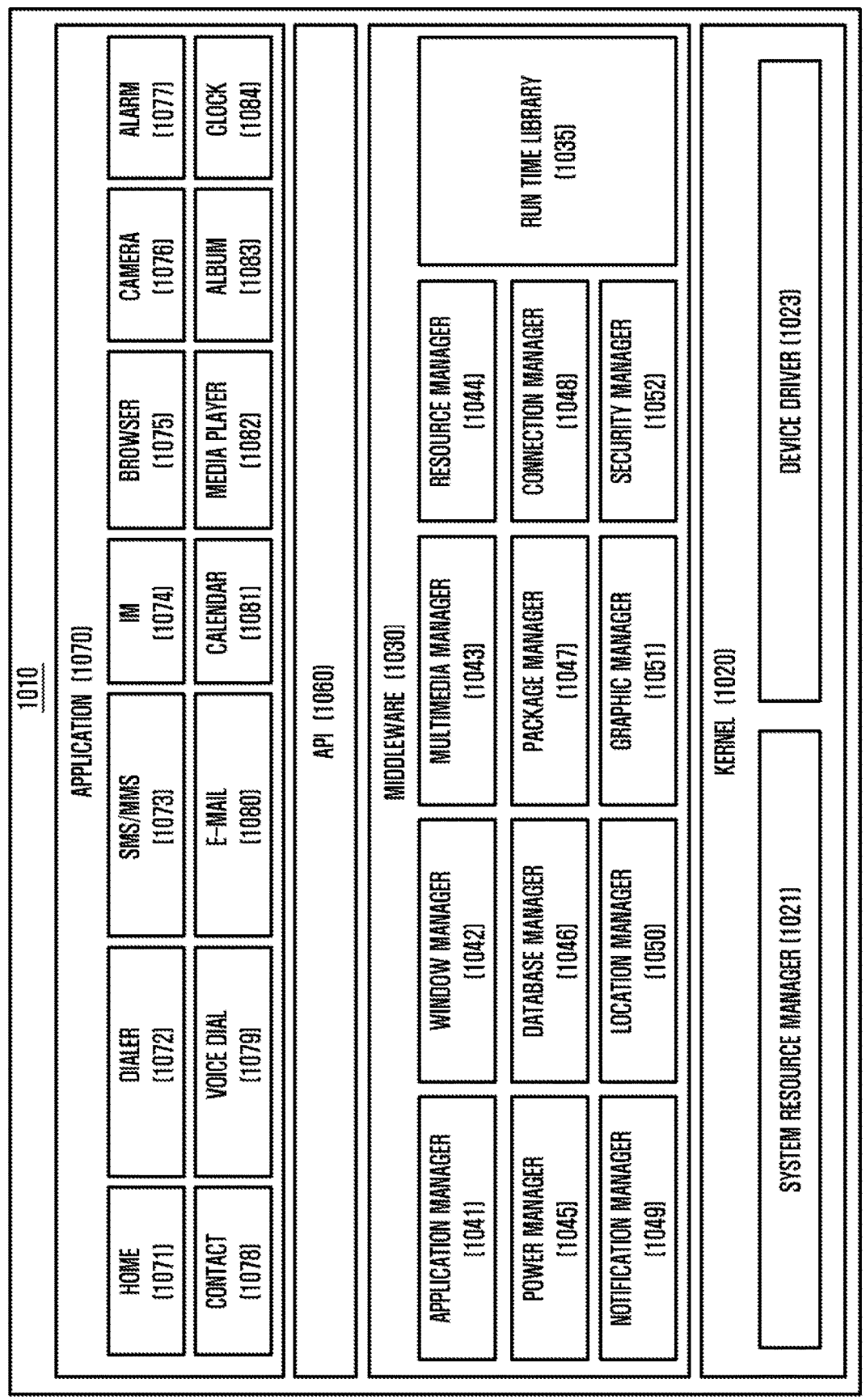
FIG. 10 is a block diagram illustrating a program module according to various embodiments of the present disclosure.

FIG. 10 is a block diagram of a programming module 1010 according to an embodiment of the present disclosure.

The programming module 1010 (for example, programming module 840) may be included (stored) in the electronic device 801 (for example, memory 830) illustrated in FIG. 8. At least some of the programming module 1010 may be formed of software, firmware, hardware, or a combination of at least two of software, firmware, and hardware. The programming module 1010 may be executed in the hardware (for example, electronic device 901) to include an OS controlling resources related to the electronic device (for example, electronic device 801) or various applications (for example, applications 1070) driving on the OS. For example, the OS may be Android, iOS, Windows, Symbian, Tizen, Bada or the like. Referring to FIG. 10, the programming module 1010 includes a kernel 1020, a middleware 1030, an API 1060, and applications 1070.

Referring to FIG. 10, the kernel 1020 (for example, kernel 841) includes a system resource manager 1021 and a device driver 1023. The system resource manager 1021 may include, for example, a process manager, a memory manager, and a file system manager. The system resource manager 1021 performs a system resource control, allocation, and recall. The device driver 1023 may include, for example, a display driver, a camera driver, a BT driver, a shared memory driver, a USB driver, a keypad driver, a WiFi driver, and an audio driver. Further, according to an embodiment, the device driver 1023 may include an inter-process communication (IPC) driver. The middleware 1030 includes a plurality of modules prepared in advance to provide a function required in common by the applications 1070. Further, the middleware 1030 provides a function through the API 1060 to allow the application 1070 to efficiently use limited system resources within the electronic device. For example, as illustrated in FIG. 10, the middleware 1030 (for example, middleware 843) includes at least one of a runtime library 1035, an application manager 1041, a window manager 1042, a multimedia manager 1043, a resource manager 1044, a power manager 1045, a database manager 1046, a package manager 1047, a connection manager 1048, a notification manager 1049, a location manager 1050, a graphic manager 1051, and a security manager 1052. The runtime library 1035 includes, for example, a library module used by a complier to add a new function through a programming language while the application 1070 is executed. According to an embodiment, the runtime library 1035 executes input and output, management of a memory, a function associated with an arithmetic function and the like. The application manager 1041 manages, for example, a life cycle of at least one of the applications 1070. The window manager 1042 manages GUI resources used on the screen. The multimedia manager 1043 detects a format required for reproducing various media files and performs an encoding or a decoding of a media file by using a codec suitable for the corresponding format. The resource manager 1044 manages resources such as a source code, a memory, or a storage space of at least one of the applications 1070.

The power manager 1045 operates together with a basic input/output system (BIOS) to manage a battery or power and provides power information required for the operation. The database manager 1046 manages generation, search, and change of a database to be used by at least one of the applications 1070. The package manager 1047 manages an installation or an update of an application distributed in a form of a package file.

The connection manager 1048 manages, for example, a wireless connection such as WiFi or BT. The notification manager 1049 displays or notifies a user of an event such as an arrival message, an appointment, a proximity alarm or the like, in a manner that does not disturb the user. The location manager 1050 manages location information of the electronic device. The graphic manager 1051 manages a graphic effect provided to the user or a user interface related to the graphic effect. The security manager 1052 provides a general security function required for a system security or a user authentication. According to an embodiment, when the electronic device (for example, electronic device 801 or 901) has a call function, the middleware 1030 may further include a telephony manager for managing a voice of the electronic device or a video call function. The middleware 1030 may generate a new middleware module through a combination of various functions of the aforementioned internal component modules and use the generated new middleware module. The middleware 1030 may provide a module specified for each type of OS to provide a differentiated function. Further, the middleware 1030 may dynamically delete some of the conventional components or add new components. Accordingly, some of the components described in the embodiment of the present disclosure may be omitted, replaced with other components having different names but performing similar functions, or other components may be further included.

The API 1060 (for example, API 845) is a set of API programming functions, and may be provided with a different configuration according to an OS. For example, in Android or iOS, a single API set may be provided for each platform. In Tizen, two or more API sets may be provided. The applications 1070, which may include an application similar to the application 834, may include, for example, a preloaded application and/or a third party application. The applications 1070 may include a home application 1071 a dialer application 1072, a SMS/multimedia messaging service (MMS) application 1073, an instant messaging (IM) application 1074, a browser application 1075, a camera application 1076, an alarm application 1077, a contact application 1078, a voice dial application 1079, an email application 1080, a calendar application 1081, a media player application 1082, an album application 1083, and a clock application 1084. However, the present embodiment is not limited thereto, and the applications 1070 may include any other similar and/or suitable application. At least a part of the programming module 1010 can be implemented by commands stored in computer-readable storage media. When the commands are executed by at least one processor, e.g. the AP 910, at least one processor can perform functions corresponding to the commands. The computer-readable storage media may be, for example, the memory 930. At least a part of the programming module 1010 can be implemented, e.g. executed, by, for example, the AP 910. At least a part of the programming module 1010 may include, for example, a module, a program, a routine, a set of instructions and/or a process for performing at least one function.

The titles of the aforementioned elements of the programming module, e.g. the programming module 1010, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific integrated circuit (ASIC) chip, field-programmable gate arrays (FPGAs), and programmable-logic device, which have been known or are to be developed. At least part of the device (e.g., modules or functions thereof) or method (e.g., operations) according to various embodiments may be implemented as commands stored, e.g., in the form of program module, in a computer-readable storage medium. In case commands are executed by a processor (e.g., 820), the processor may perform a particular function corresponding to that commands. The computer-readable storage medium may be, for example, the memory 830. The non-transitory computer-readable recording medium may include magnetic media such as a hard disk, a floppy disk, and a magnetic tape, optical media such as a compact disc-ROM (CD-ROM) and a DVD, magneto-optical media such as a flop-tical disk, and hardware devices specially configured to store and perform a program instruction. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa. A module or programming module according to this disclosure may include or exclude at least one of the above-discussed elements or further include any other element. The operations performed by the module, programming module or any other element according to this disclosure may be executed sequentially, in parallel, repeatedly, or by a heuristic method. Additionally, some operations may be executed in different orders or omitted, or any other operation may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a housing comprising:
a first plate facing a first direction, and
a second plate facing a second direction opposite to the first direction,
and forming a space between the first and second plates;
a side member surrounding at least part of the space;
a display disposed in the housing and exposed through the first plate;
a printed circuit board (PCB) disposed in the housing and between the display and the second plate;
a board-type antenna including an antenna pattern formed on a board surface;
a communicator connected with the PCB and including a radio frequency (RF) communication circuitry and a WiFi communication circuitry; and
a first feeding member configured to transmit or receive a signal of the RF communication circuitry,
wherein the side member comprises a first segmented metal frame and a second segmented metal frame connected with the RF communication circuitry,
wherein the board-type antenna comprises:
a first contact configured to connect the board-type antenna to the first segmented metal frame,
a first antenna pattern connected with the WiFi communication circuitry, and
an antenna connective pattern configured to connect the first segmented metal frame and the first antenna pattern,
wherein the first contact is configured to connect the first feeding member and the first segmented metal frame,
wherein a nonconductive material is disposed between the first and second segmented metal frames,
wherein the second segmented metal frame is connected with the first antenna pattern and configured to provide an electrical ground,
wherein the first antenna pattern comprises:
a second feeding member connected with the board-type antenna and configured to transmit or receive a frequency of a first or second WiFi bandwidth of the WiFi communication circuitry, a second contact configured to connect the board-type antenna, the second feeding member, and the second segmented metal frame, and a third feeding member connected with the board-type antenna and configured to transmit or receive the frequency of the first or second WiFi bandwidth of the WiFi communication circuitry, and wherein the board-type antenna comprises an antenna connector is configured to connect the first and third feeding members.

2. The electronic device of claim 1, wherein the first segmented metal frame is disposed in a first direction, and the second segmented metal frame is disposed in a second direction perpendicular to the first direction.

3. The electronic device of claim 1, further comprising: an RF contact configured to connect the RF communication circuitry and the first feeding member.

4. The electronic device of claim 1, further comprising: a first WiFi contact configured to connect the WiFi communication circuitry and the second feeding member.

5. The electronic device of claim 1, further comprising: a second WiFi contact configured to connect the WiFi communication circuitry and the third feeding member.

6. The electronic device of claim 1, wherein the antenna pattern is formed using at least one of a laser direct structuring (LDS) manner, a direct printing antenna (DPA) manner, or a flexible PCB (FPCB) manner.

7. The electronic device of claim 1, wherein a nonconductive material is disposed between the first segmented metal frame and the board-type antenna.

8. The electronic device of claim 1, wherein the PCB is disposed in the space, and the board-type antenna is disposed on the PCB.

9. The electronic device of claim 8, wherein the PCB is connected with the first or second segmented metal frame.

* * * * *